(12) United States Patent
Whitcher et al.

(10) Patent No.: US 10,306,847 B2
(45) Date of Patent: Jun. 4, 2019

(54) ENVIRONMENTALLY CONTROLLED VERTICAL FARMING SYSTEM

(71) Applicant: MJNN LLC, South San Francisco, CA (US)

(72) Inventors: John L. Whitcher, Tualatin, OR (US); Jack Oslan, Henderson, NV (US); Nate Mazonson, Menlo Park, CA (US); Nathaniel R. Storey, Laramie, WY (US); Daniel Cook, Woodside, CA (US); Philip E. Beatty, Tualatin, OR (US); Matthew Barnard, Woodside, CA (US); Christopher K. Conway, Loomis, CA (US); Ernest Learn, Loomis, CA (US); Michael Duffy, Duryea, PA (US); Russell Varone, Fremont, CA (US); Russell Field, Portola Valley, CA (US); William R. George, Santa Cruz, CA (US); Rob Jensen, Rocklin, CA (US); Benjamin J. Clark, Redwood City, CA (US); Jaremy Creechley, Laramie, WY (US); Matteo Melani, Menlo Park, CA (US)

(73) Assignee: MJNN, LLC, South San Francisco, CA (US)

(\*) Notice: Subject to any disclaimer, the term of this patent is extended or adjusted under 35 U.S.C. 154(b) by 0 days.

(21) Appl. No.: 15/278,148

(22) Filed: Sep. 28, 2016

(65) Prior Publication Data

US 2018/0014485 A1    Jan. 18, 2018

Related U.S. Application Data

(60) Provisional application No. 62/369,520, filed on Aug. 1, 2016, provisional application No. 62/366,510, filed
(Continued)

(51) Int. Cl.
*A01G 31/06* (2006.01)
*A01G 7/02* (2006.01)
(Continued)

(52) U.S. Cl.
CPC .............. *A01G 31/06* (2013.01); *A01G 2/20* (2018.02); *A01G 7/02* (2013.01); *A01G 7/045* (2013.01);
(Continued)

(58) Field of Classification Search
CPC .......... A01G 9/00; A01G 31/00; A01G 31/02; A01G 31/04; A01G 31/045; A01G 31/06
(Continued)

(56) References Cited

U.S. PATENT DOCUMENTS 2,244,677 A * 6/1941 Cornell ................. A01G 9/143
198/680
3,254,448 A * 6/1966 Ruthner ................. A01G 9/143
47/17
(Continued)

FOREIGN PATENT DOCUMENTS

| EP | 2491784 A1 | 8/2012 |
| WO | WO-2016070196 A1 | 5/2016 |
| WO | WO-2016118175 A1 | 7/2016 |

OTHER PUBLICATIONS

Co-pending U.S. Appl. No. 15/278,181, filed Sep. 28, 2016.
(Continued)

*Primary Examiner* — David J Parsley
(74) *Attorney, Agent, or Firm* — Patent Law Office of David G. Beck

(57) ABSTRACT

A plant growing system configured for high density crop growth and yield, including an environmentally-controlled growing chamber and a vertical growth column within, the column configured to support a hydroponic plant growth
(Continued)

module which is configured for containing and supporting plant growth media for containing and supporting a root structure of at least one gravitropic crop plant growing therein and for detachably mounting to the vertical growth column, the hydroponic plant growth module including a lateral growth opening to allow the plant to grow laterally through toward a light emitting source, a nutrient supply system to direct aqueous crop nutrient solution through an upper opening of the hydroponic plant growth module, an airflow source to direct airflow away from the growth opening and through an under-canopy of the plant, so as to disturb the boundary layer, and a control system for regulating, at least one growing condition in an area in or adjacent to the under-canopy.

11 Claims, 17 Drawing Sheets

Related U.S. Application Data on Jul. 25, 2016, provisional application No. 62/362,380, filed on Jul. 14, 2016.

(51) Int. Cl.
| | | |
|---|---|---|
| A01G 7/04 | (2006.01) | |
| A01G 9/24 | (2006.01) | |
| A01G 9/26 | (2006.01) | |
| A01G 31/02 | (2006.01) | |
| A01G 31/04 | (2006.01) | |
| H04N 7/18 | (2006.01) | |
| H05B 37/02 | (2006.01) | |
| A01G 2/20 | (2018.01) | |
| A01G 9/029 | (2018.01) | |
| A01G 9/02 | (2018.01) | |
| A01G 27/00 | (2006.01) | |
| H05B 33/08 | (2006.01) | |

(52) U.S. Cl.
CPC .............. *A01G 9/023* (2013.01); *A01G 9/029* (2018.02); *A01G 9/246* (2013.01); *A01G 9/247* (2013.01); *A01G 9/26* (2013.01); *A01G 27/00* (2013.01); *A01G 31/02* (2013.01); *A01G 31/04* (2013.01); *A01G 31/045* (2013.01); *H04N 7/183* (2013.01); *H05B 37/0227* (2013.01); *H05B 33/0854* (2013.01); *Y02P 60/216* (2015.11)

(58) Field of Classification Search
USPC .......................... 47/59 R, 60, 62 R, 63, 48.5
See application file for complete search history.

(56) References Cited

U.S. PATENT DOCUMENTS

| | | | | |
|---|---|---|---|---|
| 3,529,379 | A | * | 9/1970 | Ware .......................... F24F 3/12 47/17 |
| 4,255,897 | A | * | 3/1981 | Ruthner ................. A01G 7/045 47/17 |
| 4,574,520 | A | | 3/1986 | Arledge |
| 4,669,217 | A | | 6/1987 | Fraze |
| 5,173,079 | A | | 12/1992 | Gerrish |
| 5,363,594 | A | | 11/1994 | Davis |
| 5,533,302 | A | | 7/1996 | Lynch et al. |
| 5,617,673 | A | * | 4/1997 | Takashima ........... A01G 31/047 47/39 |
| 6,247,268 | B1 | | 6/2001 | Auer |
| 6,691,135 | B2 | | 2/2004 | Pickett et al. |
| 6,840,008 | B1 | | 1/2005 | Bullock et al. |
| 7,055,282 | B2 | | 6/2006 | Bryan, III |
| 7,080,482 | B1 | | 7/2006 | Bradley |
| 7,168,206 | B2 | * | 1/2007 | Agius .................. A01G 31/042 47/62 R |
| 7,406,854 | B2 | | 8/2008 | Lange et al. |
| 7,559,173 | B2 | * | 7/2009 | Brusatore ............ A01G 31/047 47/59 R |
| 7,818,917 | B2 | | 10/2010 | Brusatore |
| 7,984,586 | B2 | | 7/2011 | Brusatore |
| 8,266,840 | B2 | | 9/2012 | Jung |
| 8,533,993 | B2 | | 9/2013 | Pettibone |
| 8,847,514 | B1 | | 9/2014 | Reynoso et al. |
| 8,893,431 | B2 | | 11/2014 | Busch et al. |
| 8,966,815 | B1 | | 3/2015 | Smiles |
| 9,226,457 | B2 | * | 1/2016 | Laurence ............... A01G 9/025 |
| D758,917 | S | | 6/2016 | Smith |
| 9,591,814 | B2 | | 3/2017 | Collins et al. |
| 2006/0162252 | A1 | | 7/2006 | Lim |
| 2007/0251145 | A1 | | 11/2007 | Brusatore et al. |
| 2009/0000189 | A1 | | 1/2009 | Black |
| 2009/0223128 | A1 | | 9/2009 | Kuschak |
| 2009/0255179 | A1 | | 10/2009 | Felknor |
| 2010/0042234 | A1 | | 2/2010 | May et al. |
| 2011/0025519 | A1 | | 2/2011 | Donaldson et al. |
| 2012/0047801 | A1 | | 3/2012 | Hogan |
| 2012/0137578 | A1 | | 6/2012 | Bradford et al. |
| 2012/0311926 | A1 | | 12/2012 | Mittelmark |
| 2013/0152468 | A1 | | 6/2013 | Huang et al. |
| 2013/0326950 | A1 | | 12/2013 | Nilles |
| 2014/0000162 | A1 | | 1/2014 | Blank |
| 2014/0000163 | A1 | | 1/2014 | Lin |
| 2014/0115958 | A1 | | 5/2014 | Helene et al. |
| 2014/0165468 | A1 | | 6/2014 | Roeser et al. |
| 2014/0200690 | A1 | | 7/2014 | Kumar |
| 2014/0223816 | A1 | | 8/2014 | Parker |
| 2014/0352211 | A1 | | 12/2014 | Liotta |
| 2015/0000190 | A1 | | 1/2015 | Gibbons |
| 2015/0005964 | A1 | | 1/2015 | Liotta |
| 2015/0113875 | A1 | | 4/2015 | Liotta |
| 2015/0173315 | A1 | | 6/2015 | Aznar |
| 2015/0196002 | A1 | | 7/2015 | Friesth |
| 2015/0223418 | A1 | | 8/2015 | Collins et al. |
| 2015/0264868 | A1 | | 9/2015 | Smiles |
| 2015/0313104 | A1 | | 11/2015 | Cottrell |
| 2015/0334930 | A1 | | 11/2015 | Stoltzfus et al. |
| 2016/0066525 | A1 | | 3/2016 | Duquesnay et al. |
| 2017/0055474 | A1 | | 3/2017 | Storey |

OTHER PUBLICATIONS

Co-pending U.S. Appl. No. 15/278,564, filed Sep. 28, 2016.
PCT/US2016/054244 International Search Report and Written Opinion dated Dec. 20, 2016.
PCT/US2016/054245 International Search Report and Written Opinion dated Dec. 20, 2016.
PCT/US2016/054246 International Search Report and Written Opinion dated Dec. 23, 2016.
The Coliseum grows large gardens in a small space! Growco Indoor Garden Supply. https://4hydroponics.com/hydroponics/vertical-hydroponics/coliseum (6 pgs.) (Accessed Feb. 2017).
U.S. Appl. No. 15/278,564 1st Action Interview dated Mar. 15, 2017.
U.S. Appl. No. 15/278,564 1st Action Interview dated Mar. 3, 2017.
U.S. Appl. No. 15/278,181 1st Action Interview dated Jul. 27, 2017.
U.S. Appl. No. 15/278,181 1st Action Interview dated Jun. 20, 2017.
U.S. Appl. No. 15/278,181 Office Action dated Sep. 19, 2017.
U.S. Appl. No. 15/278,564 1st Action Interview dated Jul. 7, 2017.
U.S. Appl. No. 15/278,564 1st Action Interview dated Jun. 20, 2017.

* cited by examiner

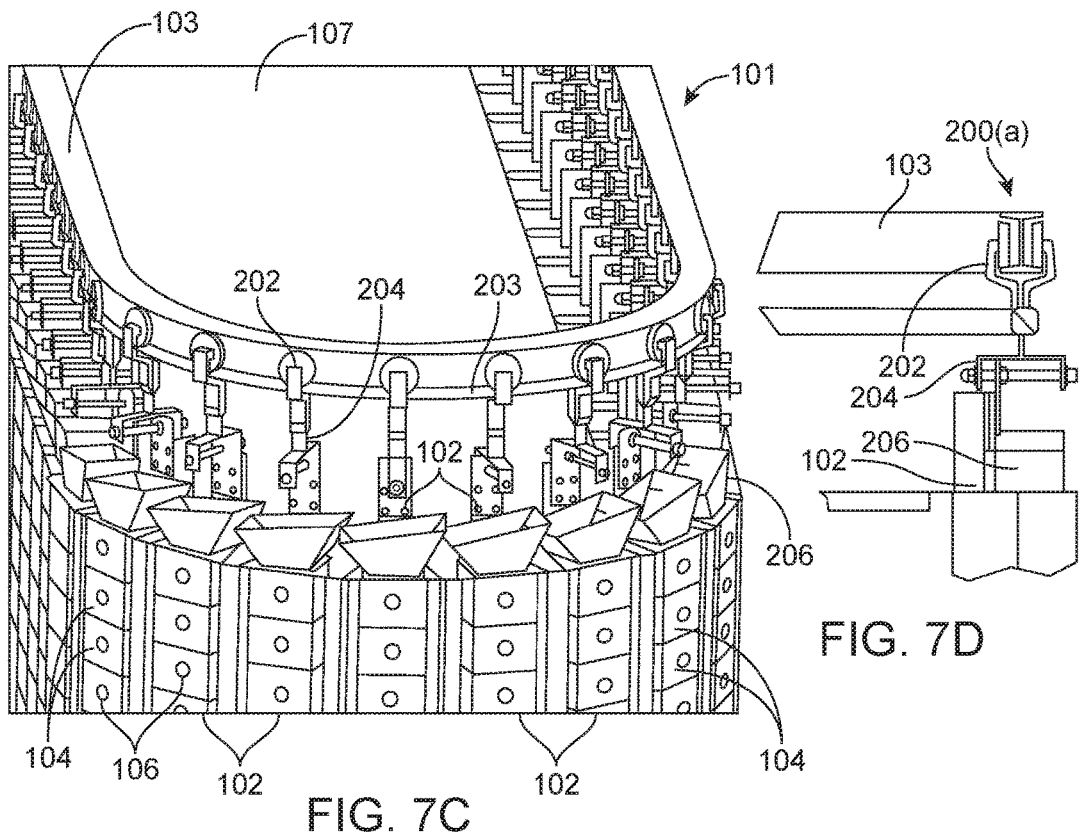
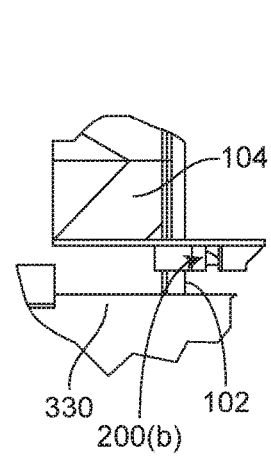
FIG. 7D
FIG. 7C
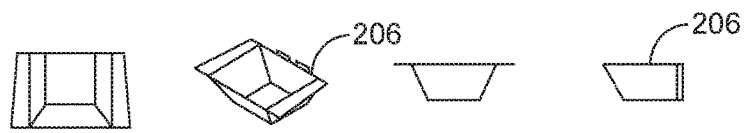
FIG. 7E
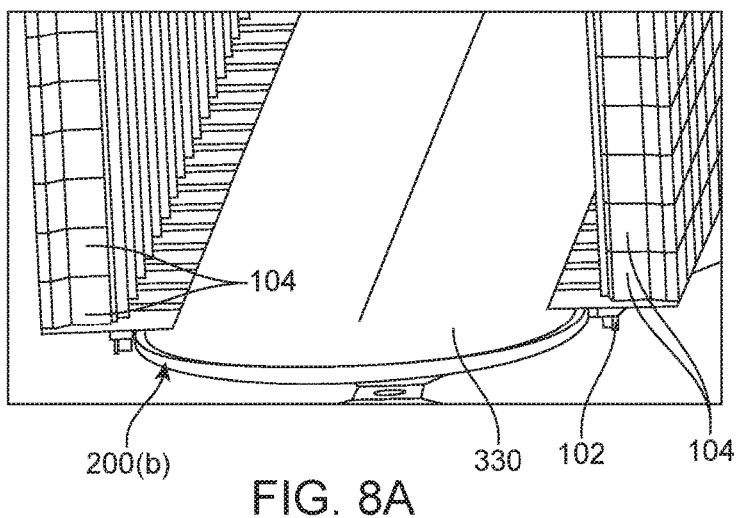
FIG. 8A
FIG. 8B

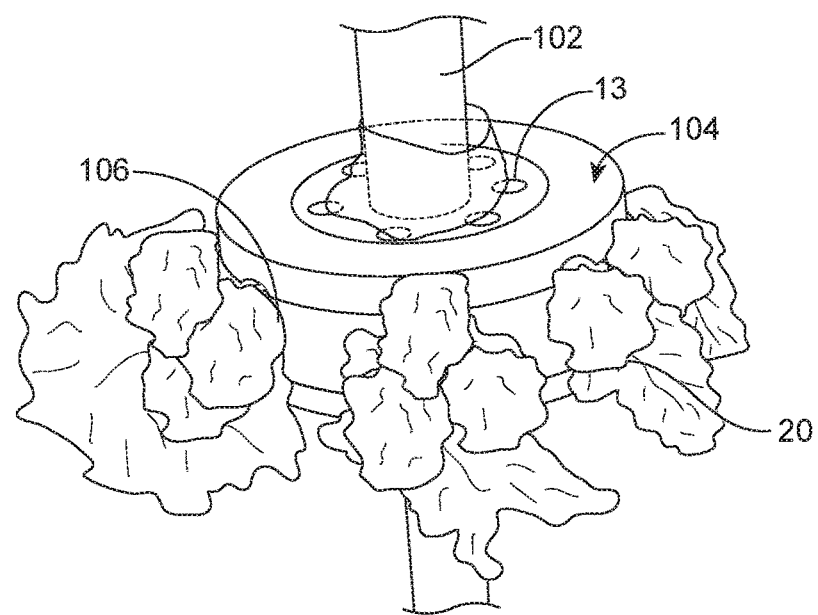
FIG. 12A
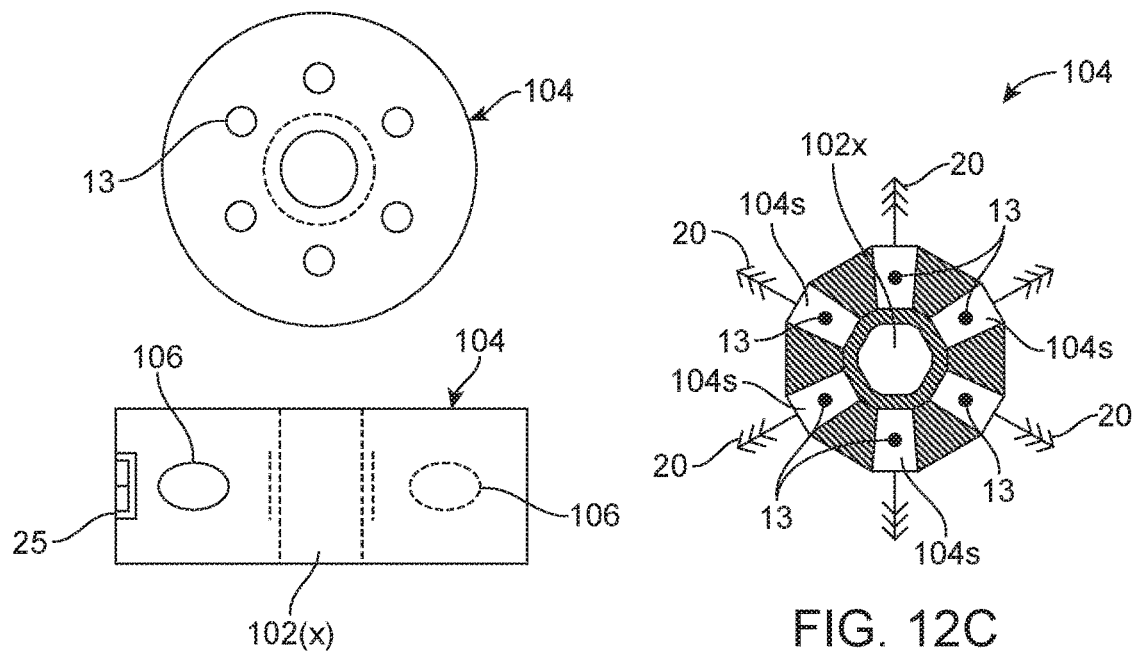
FIG. 12B
FIG. 12C

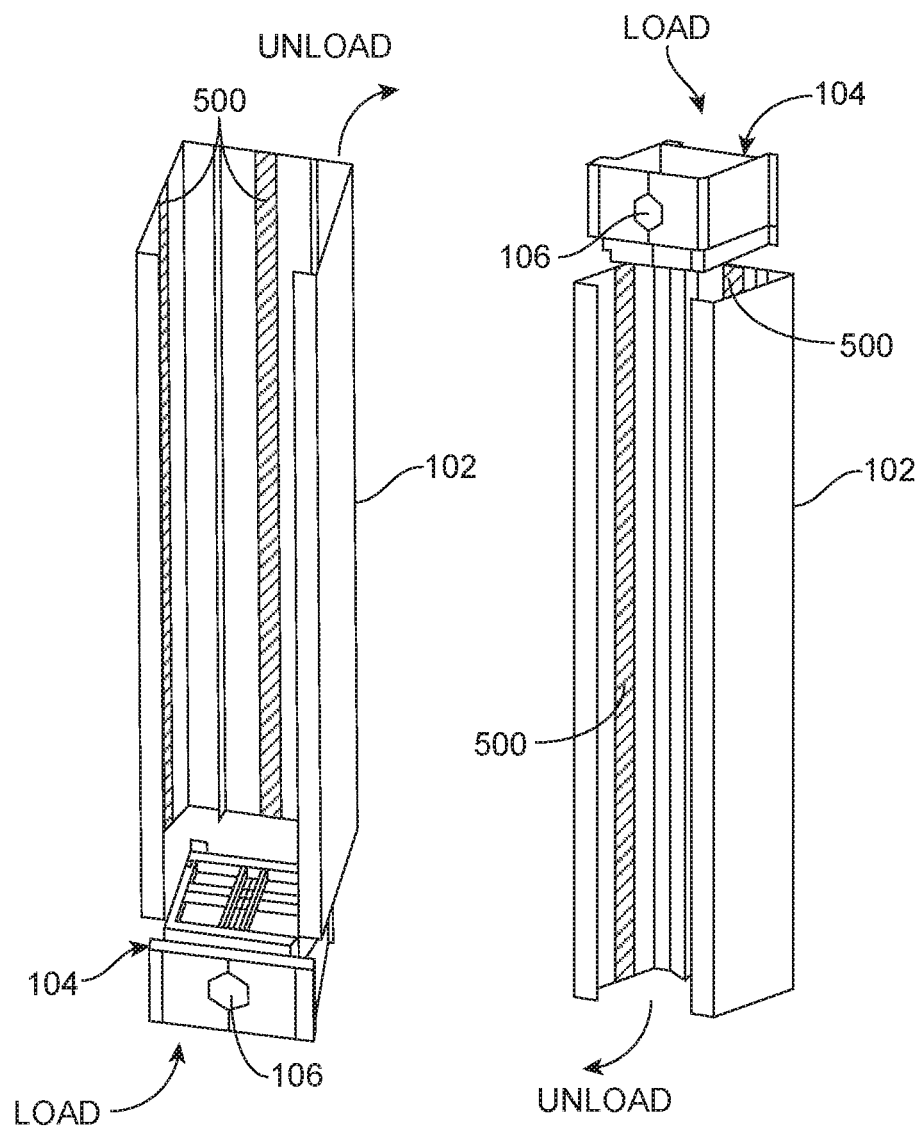

ENVIRONMENTALLY CONTROLLED VERTICAL FARMING SYSTEM

CROSS-REFERENCE

The present application claims priority to U.S. Provisional Patent Application No. 62/362,380, filed Jul. 14, 2016, U.S. Provisional Patent Application No. 62/366,510, filed Jul. 25, 2016 and U.S. Provisional Patent Application No. 62/369,520, filed Aug. 1, 2016, which are incorporated herein by reference in their entirety.

BACKGROUND OF THE INVENTION

This invention relates generally to a vertical hydroponic and aeroponic plant production apparatus and system and, more particularly, the invention relates to a vertical hydroponic and aeroponic plant production apparatus and system including a controlled environment allowing for vertical hydroponic and aeroponic crop production in a fraction of the space necessary for traditional plant production techniques.

SUMMARY OF THE INVENTION

During the twentieth century, agriculture slowly began to evolve from a conservative industry to a fast-moving high-tech industry in order to keep up with world food shortages, climate change and societal changes moving away from manually-implemented agriculture techniques increasingly toward computer implemented technologies. In the past, and in many cases still today, farmers only had one growing season to produce the crops that would determine their revenue and food production for the entire year. However, this is changing. As indoor growing becomes more viable and increasingly employs data processing technologies, and other advanced techniques, the science of agriculture has become more agile and is adapting and learning as new data is collected and insights are generated.

Advancements in technology have led to the advent of "controlled indoor agriculture". Improved efficiencies in space utilization, lighting, and a better understanding of hydroponics, aeroponics, crop cycles, and advancements in environmental control systems have allowed humans to create environments that are more conducive for agriculture to increase yields per square foot, nutrition and profit margins.

The inventors combine advances in agriculture with the more recent concept of assembly line automation, and herein have conceived a vertical farming structure within a controlled environment which have columns comprising automated growth modules. The vertical structure is capable of being moved about an automated conveyance system in an open or closed-loop fashion, while being exposed to precision-controlled lighting, airflow, humidity and ideal nutritional support.

Among those technological advancements is the application of new control systems capable of machine learning, or artificial intelligence, which assimilate thousands or even millions of data points acquired by strategically placed sensors during the course of a growing cycle or multiple growing cycles, automatically adjust year-round crop growth conditions within the controlled environment such as lighting, fertilizers (nutrients), moisture, gas levels, temperature, air flow, and thus enable higher yields reduced overall crop loss, increased nutritional value, preferable visual appeal and faster growth cycles.

Provided herein is a plant growing system configured for high density crop growth and yield, the system comprising: an environmentally-controlled growing chamber; a vertical growth column, within the growing chamber, configured to support a hydroponic plant growth module; the hydroponic plant growth module configured for: containing and supporting hydroponic plant growth media for containing and supporting a root structure of at least one crop plant growing therein, the at least one crop plant being of a gravitropic plant species; and detachably mounting to the vertical growth column, the hydroponic plant growth module comprising: a lateral growth opening configured to allow the at least one growing crop plant to grow through the growth opening in a lateral direction of growth when the hydroponic plant growth module is mounted to one of the vertical growth columns; and an upper and a lower opening, each configured to allow an aqueous crop nutrient solution to flow therethrough; a light emitting source positioned laterally from the lateral growth opening when the hydroponic plant growth module is mounted to the vertical growth column, the light emitting source configured to emit light toward the lateral growth opening in a direction generally opposite to the lateral direction of growth, to thereby at least partly suppress gravitropism in the growing plant and to encourage the plant to grow from the lateral growth opening in the lateral direction of growth; a nutrient supply system configured to direct the aqueous crop nutrient solution through the upper opening of the hydroponic plant growth module when mounted to the vertical growth column; an airflow source configured to, when the hydroponic plant growth module is mounted to the vertical growth column, direct airflow away from the lateral growth opening in the lateral growth direction of growth and through an under-canopy of the growing plant, so as to disturb the boundary layer of the under-canopy of the growing plant; and a control system for regulating, when the hydroponic plant growth module is mounted to the vertical growth column, at least one growing condition in an area in or adjacent to the under-canopy, the at least one growing condition selected from the group consisting of: air temperature, airflow, relative air humidity, and ambient carbon dioxide gas content. In some embodiments, the plant growing system further comprises a plenum to receive and direct air from the airflow source, wherein the airflow source is a forced airflow, further wherein the plenum comprises a plurality of ducts configured to, when the hydroponic module is mounted to the vertical growth column, direct airflow away from the lateral growth opening in the lateral growth direction of growth and through an under-canopy of the growing plant, so as to disturb the boundary layer of the under-canopy of the growing plant. In some embodiments, the plant growing system is further configured to stackably support one or more other hydroponic plant growth modules mounted to the vertical column either above and/or below itself. In some embodiments, the hydroponic plant growth module is further configured to: receive, through the upper opening, from another hydroponic plant growth module mounted to the vertical column above itself, a vertical flow of the aqueous crop nutrient solution; direct, through the lower opening, to another hydroponic plant growth module mounted to the vertical column below itself, a vertical flow of the aqueous crop nutrient solution; or a combination thereof. In some embodiments, the light emitting source comprises light emitting diodes (LEDs). In some embodiments, the hydroponic plant growth module comprises a plurality of the lateral growth openings. In some embodiments, the plant species is a leafy green. In some embodiments, the plant species is an edible plant species selected from the group consisting of: Apiaceae; Asteraceae; Lauraceae; palms; herbs; Sapindaceae; and Solanaceae. In some embodiments, the control system regulates at least a second growing condition selected from the group consisting of: temperature of the aqueous crop nutrient solution, pH of the aqueous crop nutrient solution, electrical conductivity of the aqueous crop nutrient solution, flow rate of the aqueous crop nutrient solution, quality of light emission from the light emitting source, and quantity of light emission from the light emitting source. In some embodiments, the airflow source is configured to generate sufficient airflow so as to disrupt growth of bacteria or fungi. In some embodiments, the vertical growth column is configured to be free-standing. In some embodiments, the vertical growth column is configured to be rotatable about a central axis. In some embodiments, the vertical growth column is configured with a guided vertical lift mechanism, incorporated into the vertical growth column, capable of individually supporting, individually spacing, lifting and lowering the hydroponic plant growth module mounted to the vertical growth column. In some embodiments, the system further comprises a loading/unloading system to control position, movement and placement of the hydroponic plant growth module along the vertical growth column.

Provided herein is a plant growing system configured for high density growth and crop yield, the system comprising: an environmentally-controlled growing chamber; a vertical growth column, within the growing chamber, configured to support one or more hydroponic plant growth modules; each hydroponic plant growth module configured for: containing and supporting hydroponic plant growth media for containing and supporting a root structure of at least one crop plant growing therein, the at least one crop plant being of a gravitropic plant species; and detachably mounting to the vertical growth column, each hydroponic plant growth module comprising: a lateral growth opening configured to allow the at least one growing crop plant to grow through the growth opening in a lateral direction of growth when the hydroponic plant growth module is mounted to one of the vertical growth columns; and an upper and a lower opening, each configured to allow an aqueous crop nutrient solution to flow therethrough; a light emitting source positioned laterally from the lateral growth opening of one of the hydroponic plant growth modules when the one hydroponic plant growth module is mounted to the one vertical growth column, the light emitting source configured to emit light toward the lateral growth opening in a direction generally opposite to the lateral direction of growth, to thereby at least partly suppress gravitropism in the growing plant and to encourage the plant to grow from the lateral growth opening in the lateral direction of growth; a nutrient supply system configured to direct the aqueous crop nutrient solution through the upper opening of the one hydroponic plant growth module when mounted to the one vertical growth column; an airflow source configured to, when the one hydroponic plant growth module is mounted to the one vertical growth column, direct airflow away from the lateral growth opening in the lateral growth direction of growth and through an under-canopy of the growing plant, so as to disturb the boundary layer of the under-canopy of the growing plant; a control system for regulating, when the hydroponic plant growth module is mounted to the one vertical growth column, at least one growing condition in an area in or adjacent to the under-canopy, the at least one growing condition selected from the group consisting of: air temperature, airflow speed, relative air humidity, and ambient carbon dioxide gas content; and a conveyance system for moving the one vertical growth column in a circuit within the environmentally-controlled growing chamber throughout the plant's growth cycle, the circuit comprising a staging area configured for loading plants into, and harvesting crops from, the hydropic plant growth modules. In some embodiments, the plant growing system further comprises a plenum to receive and direct air from the airflow source, wherein the airflow source is a forced airflow, further wherein the plenum comprises a plurality of ducts configured to, when the hydroponic module is mounted to the vertical growth column, direct airflow away from the lateral growth opening in the lateral growth direction of growth and through an under-canopy of the growing plant, so as to disturb the boundary layer of the under-canopy of the growing plant. In some embodiments, the plant growing system is further configured to stackably support one or more other hydroponic plant growth modules mounted to the vertical column either above and/or below itself. In some embodiments, the hydroponic plant growth module is further configured to: receive, through the upper opening, from another hydroponic plant growth module mounted to the vertical column above itself, a vertical flow of the aqueous crop nutrient solution; direct, through the lower opening, to another hydroponic plant growth module mounted to the vertical column below itself, a vertical flow of the aqueous crop nutrient solution; or a combination thereof. In some embodiments, the light emitting source comprises light emitting diodes (LEDs). In some embodiments, the hydroponic plant growth module comprises a plurality of the lateral growth openings. In some embodiments, the plant species is a leafy green. In some embodiments, the plant species is an edible plant species selected from the group consisting of: Apiaceae; Asteraceae; Lauraceae; palms; herbs; Sapindaceae; and Solanaceae. In some embodiments, the control system regulates at least a second growing condition selected from the group consisting of: temperature of the aqueous crop nutrient solution, pH of the aqueous crop nutrient solution, electrical conductivity of the aqueous crop nutrient solution, flow rate of the aqueous crop nutrient solution, quality of light emission from the light emitting source, and quantity of light emission from the light emitting source. In some embodiments, the airflow source is configured to generate sufficient airflow so as to disrupt growth of bacteria or fungi. In some embodiments, the vertical growth column is configured to be free-standing. In some embodiments, the vertical growth column is configured to be rotatable about a central axis. In some embodiments, the vertical growth column is configured with a guided vertical lift mechanism, incorporated into the vertical growth column, capable of individually supporting, individually spacing, lifting and lowering the hydroponic plant growth module mounted to the vertical growth column. In some embodiments, the system further comprises a loading/unloading system to control position, movement and placement of the hydroponic plant growth module along the vertical growth column.

Provided herein is a plant growing system configured for high density crop growth and yield, the system comprising: an environmentally-controlled growing chamber; a vertical growth column, within the growing chamber, configured to support a hydroponic plant growth module; the hydroponic plant growth module configured for: containing and supporting hydroponic plant growth media for containing and supporting a root structure of at least one crop plant growing therein, the at least one crop plant being of a gravitropic plant species; and detachably mounting to the vertical growth column, the hydroponic plant growth module comprising: a lateral growth opening configured to allow the at least one growing plant to grow through the growth opening in a lateral direction of growth when the hydroponic plant growth module is mounted to one of the vertical growth columns; and an upper and a lower opening, each configured to allow an aqueous crop nutrient solution to flow therethrough; a light emitting source positioned laterally from the lateral growth opening when the hydroponic plant growth module is mounted to the vertical growth column, the light emitting source configured to emit light toward the lateral growth opening in a direction generally opposite to the lateral direction of growth, to thereby at least partly suppress gravitropism in the growing crop plant and to encourage the crop plant to grow from the lateral growth opening in the lateral direction of growth; a nutrient supply system configured to direct the aqueous crop nutrient solution through the upper opening of the hydroponic plant growth module when mounted to the vertical growth column; an airflow source configured to, when the hydroponic plant growth module is mounted to the vertical growth column, direct airflow away from the lateral growth opening in the lateral growth direction of growth and through an under-canopy of the growing plant, so as to disturb the boundary layer of the under-canopy of the growing plant; and a control system comprising: a sensor configured for measuring an environmental growing condition in the environmentally-controlled growing chamber over time to generate environmental condition data; a device configured for measuring a crop characteristic of a plant grown in the hydroponic plant growth module in the environmentally-controlled growing chamber to generate crop growth data; and a processing device comprising at least one processor, a memory, an operating system configured to perform executable instructions, and a computer program including instructions executable by the processing device to create an application comprising: a software module configured for receiving the environmental condition data and the crop growth data from the environmental sensor and the measuring device; a software module configured to apply an algorithm to the environmental condition data and the crop growth data to generate an improved environmental growing condition; and a software module configured to generate and transmit instructions for adjustment of the environmental growing condition in or around the hydroponic plant growth module to a sub-system of the environmentally-controlled growing chamber to implement the improved environmental growing condition. In some embodiments, the device is a digital image capturing device positioned and configured to capture images of the under-canopy when the hydroponic plant growth module is mounted to the vertical growth columns, further wherein the crop characteristic is a leaf area index. In some embodiments, the plant growing system further comprises a plurality of nutrient concentration sensors adapted to measure, in the aqueous crop nutrient solution, an aqueous concentration of at least one nutrient selected from the group consisting of: zinc; molybdenum; manganese; iron; copper; chlorine; boron; sulfur; magnesium; calcium; potassium; phosphorus; and nitrogen. In some embodiments, the sub-system is selected from the group consisting of: a lighting control sub-system; a HVAC control sub-system; a nutrient supply control sub-system; a conveyance control sub-system; and a vertical lift mechanism control sub-system. In some embodiments, the computer program including instructions executable by the processing device comprises artificial intelligence programming capable of generating an improved environmental growing condition based at least in part on continuously updated environmental and crop growth data.

In some embodiments of the plant growing systems above, the plant growing system further comprises a plenum to receive and direct air from the airflow source, wherein the airflow source is a forced airflow, further wherein the plenum comprises a plurality of ducts configured to, when the hydroponic module is mounted to the vertical growth column, direct airflow away from the lateral growth opening in the lateral growth direction of growth and through an under-canopy of the growing plant, so as to disturb the boundary layer of the under-canopy of the growing plant. In some embodiments, the plant growing system is further configured to stackably support one or more other hydroponic plant growth modules mounted to the vertical column either above and/or below itself. In some embodiments, the hydroponic plant growth module is further configured to: receive, through the upper opening, from another hydroponic plant growth module mounted to the vertical column above itself, a vertical flow of the aqueous crop nutrient solution; direct, through the lower opening, to another hydroponic plant growth module mounted to the vertical column below itself, a vertical flow of the aqueous crop nutrient solution; or a combination thereof. In some embodiments, the light emitting source comprises light emitting diodes (LEDs). In some embodiments, the hydroponic plant growth module comprises a plurality of the lateral growth openings. In some embodiments of the plant growing systems above, the plant species is a leafy green.

In some embodiments of the plant growing systems above, the plant species is an edible plant species selected from the group consisting of: Apiaceae; Asteraceae; Lauraceae; palms; herbs; Sapindaceae; and Solanaceae.

In some embodiments of the plant growing systems above, the airflow source is configured to generate sufficient airflow so as to disrupt growth of bacteria or fungi.

In some embodiments of the plant growing systems above, the vertical growth column is configured to be free-standing.

In some embodiments of the plant growing systems above, the vertical growth column is configured to be rotatable about a central axis.

In some embodiments of the plant growing systems above, the vertical growth column is configured with a guided vertical lift mechanism, incorporated into the vertical growth column, capable of individually supporting, individually spacing, lifting and lowering the hydroponic plant growth module mounted to the vertical growth column.

In some embodiments of the plant growing systems above, the plant growing system further comprises a loading/unloading system to control position, movement and placement of the hydroponic plant growth module along the vertical growth column.

Provided herein is a multi-stage plant growing system configured for high density growth and crop yield, the system comprising: an environmentally-controlled growing chamber; a plurality of vertical growth columns, disposed within the growing chamber, each configured to support at least one hydroponic plant growth module; a plurality of said hydroponic plant growth modules, each configured for mounting to at least one of the vertical growth columns, each hydroponic plant growth module comprising at least one lateral growth opening; a nutrient supply system configured to provide water and nutrients to the hydroponic plant growth modules; a light emitting source configured to encourage lateral or modestly angled plant growth from the at least one lateral growth opening in at least one hydroponic plant growth module; an airflow source configured to direct airflow and that disturbs the boundary layer of at least one plant under-canopy of a plant growing in at least one of the hydroponic plant growth modules; and a control system for regulating or monitoring at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source.

Provided herein is a multi-stage plant growing system configured for high density growth and crop yield, the system comprising: an enclosed, environmentally-controlled growing chamber; a plurality of vertical growth columns, disposed within the growing chamber, each configured to support at least one hydroponic plant growth module; a structure for supporting the plurality of vertical growth columns; a plurality of said hydroponic plant growth modules, each configured for mounting to at least one of the vertical growth columns, each hydroponic plant growth module comprising at least one lateral growth opening; a gravity-feed nutrient supply system configured to provide water and nutrients to the hydroponic plant growth modules; a laterally-positioned light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, wherein the vertical columns are positioned about the supporting structure so as to provide optimal spacing for high density growth from a crop of plants growing out of the at least one lateral opening in each hydroponic plant growth module, and wherein the crop of plants are continually staged in their planting cycles about the columns so as to provide a continuous annual yield.

Provided herein is a multi-stage plant growing system configured for high density growth and crop yield, the system comprising: an enclosed, environmentally-controlled growing chamber; a plurality of vertical growth columns, disposed within the growing chamber, configured to support at least one hydroponic plant growth module; a structure for supporting the plurality of vertical growth columns; a conveyance system for moving the plurality of vertical growth columns about the perimeter of the supporting structure in a circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns or carousel structure; a laterally-positioned light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, wherein the vertical columns are positioned about the supporting structure so as to provide optimal spacing for high density growth from a crop of plants growing out of the at least one lateral opening in at least one hydroponic plant growth module, wherein the delivery mechanism of the gravity-feed nutrient supply system is positioned at the top of the vertical growth column and configured to supply said water and nutrients to at least the top hydroponic plant growth module mounted on the vertical column; wherein each of the plurality of said hydroponic plant growth modules are configured with at least one drain to allow the water and nutrients to flow vertically down to the plurality of hydroponic plant growth modules positioned below; wherein the crop of plants are continuously staged in their planting cycles about the columns so as to provide a continuous annual yield; and wherein the conveyance system is utilized to move the columns about the circuit to a staging area for loading and harvesting the crop from the hydroponic plant growth modules.

Provided herein is a multi-stage plant growing system configured for high density growth and crop yield, the system comprising: an enclosed, environmentally-controlled growing chamber; a plurality of vertical growth columns, disposed within the growing chamber, configured to support at least one hydroponic plant growth module; a structure for supporting the plurality of vertical growth columns; a conveyance system for moving the plurality of vertical growth columns about the perimeter of the supporting structure in a circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; a laterally-positioned light emitting source configured to encourage lateral plant growth from the at least one lateral growth opening in at least one hydroponic plant growth module an airflow source configured to direct airflow to disturb the boundary layer of at least one plant under-canopy of a plant growing in one of the hydroponic plant growth modules; and an environment control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, a master control system capable of machine learning (and/or artificial intelligence) configured for regulating the environment control system and movement of the conveyance system in order to provide optimal control of the crop density and yield throughout each crop growth cycle; wherein the vertical columns are positioned about the supporting structure so as to provide optimal spacing for high density growth from a crop of plants growing out of the at least one lateral opening in at least one hydroponic plant growth module, wherein the delivery mechanism of the gravity-feed nutrient supply system is positioned at the top of the vertical growth column and configured to supply said water and nutrients to at least the top hydroponic plant growth module mounted on the vertical column; wherein each of the plurality of said hydroponic plant growth modules are configured with at least one drain to allow the water and nutrients to flow vertically down to the plurality of hydroponic plant growth modules positioned below; wherein the crop of plants are continuously staged in their planting cycles about the columns so as to provide a continuous annual yield; and wherein the conveyance system is utilized to move the columns about the circuit to a staging area for loading and harvesting the crop from the hydroponic plant growth modules.

Provided herein is a multi-stage plant growing system configured for high density growth and crop yield, the system comprising: an environmentally-controlled growing chamber; a plurality of vertical growth columns, disposed within the growing chamber, each vertical growth column configured from a plurality of hydroponic plant growth modules; wherein the plurality of said hydroponic plant growth modules are each configured for mounting to another hydroponic plant growth module above and below itself in order to form said vertical growth column, each hydroponic plant growth module comprising at least one lateral growth opening; a structure for supporting the plurality of vertical growth columns; a nutrient supply system configured to provide water and nutrients to the hydroponic plant growth modules; a light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and at least one of the vertical growth columns; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source.

In any one of the preceding multi-stage plant growing system embodiments, the system further comprises a plenum to receive and direct air from the airflow source, wherein the airflow source is a forced airflow, and wherein the plenum further comprises a plurality of ducts configured to divide and distribute said forced airflow, with for example, fans or blowers, the boundary layer of at least one plant under-canopy of a plant growing in one of the hydroponic plant growth modules.

Provided herein is a multi-stage, automated plant growing system configured for high density growth and crop yield, the system comprising: an enclosed, environmentally-controlled growing chamber; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition is automatically manipulated and adjusted for any given crop, responsive to at least one identified crop characteristic, in order to optimize the crop characteristic from one crop cycle to the next.

Provided herein is a multi-stage, automated plant growing system configured for high density growth and crop yield, the system comprising: an enclosed, environmentally-controlled growing chamber; a plurality of vertical growth columns, disposed within the growing chamber, configured to support at least one hydroponic plant growth module; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; an airflow source configured to direct airflow to disturb the boundary layer of at least one plant under-canopy of a plant growing in one of the hydroponic plant growth modules; and at least one of the vertical growth columns; a light emitting source configured to encourage lateral plant growth from the at least one lateral growth opening in at least one hydroponic plant growth module; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition is automatically manipulated and adjusted for any given crop, responsive to at least one identified crop characteristic, in order to optimize the crop characteristic from one crop cycle to the next.

Provided herein is a multi-stage, automated plant growing system configured for high density growth and crop yield, the system comprising: an enclosed, environmentally-controlled growing chamber; a plurality of vertical growth columns configured to support at least one hydroponic plant growth module; a conveyance system for moving the plurality of vertical growth columns about the perimeter of the supporting structure in a circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; a light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition and movement of the conveyance system is automatically manipulated and adjusted for any given crop, responsive to at least one identified crop characteristic, in order to optimize the crop characteristic and provide optimal control of the crop density and yield throughout each crop growth cycle from one crop cycle to the next.

Provided herein is a multi-stage, automated plant growing system configured for high density growth and crop yield, the system comprising: an enclosed, environmentally-controlled growing chamber; a plurality of vertical growth columns, disposed within the growing chamber, each vertical growth column configured from a plurality of hydroponic plant growth modules; wherein the plurality of said hydroponic plant growth modules are each configured for mounting to another hydroponic plant growth module above and below itself in order to form said vertical growth column, each hydroponic plant growth module comprising at least one lateral growth opening; a structure for supporting the plurality of vertical growth columns; a conveyance system for moving the plurality of vertical growth columns about the perimeter of the supporting structure in a circuit throughout a crop growth cycle; a gravity-feed nutrient supply system configured to provide water and nutrients to the hydroponic plant growth modules with a delivery mechanism affixed to the vertical columns; an airflow source configured to direct airflow to disturb the boundary layer of at least one plant under-canopy of a plant growing in one of the hydroponic plant growth modules; and at least one of the vertical growth columns; a light emitting source configured to encourage lateral plant growth from the at least one lateral growth opening in at least one hydroponic plant growth module; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition and movement of the conveyance system is automatically manipulated and adjusted for any given crop, responsive to at least one identified crop characteristic, in order to optimize the crop characteristic and provide optimal control of the crop density and yield throughout each crop growth cycle from one crop cycle to the next.

With environmental data such as oxygen levels, humidity, temperature, light penetration, airflow etc. and data points on the crop cycle such as yield, taste, plant health, nutrient intake, etc., the learning possibilities are expanded significantly. Compounding this data within improved horticultural knowledge now makes it possible to attain up to approximately 33 crop cycles in a year, versus one or two typical growing seasons in outdoor agriculture, or as many as eight growing cycles in some greenhouse environments.

In any one of the preceding multi-stage automated plant growing system embodiments, the system optionally further comprises a plenum to receive and direct air from the airflow source; wherein the airflow source is a forced airflow, and wherein the plenum further comprises a plurality of ducts configured to divide and distribute said forced airflow, with fans or blowers, through the boundary layer of at least one plant under-canopy of a plant growing in one of the hydroponic plant growth modules. In some embodiments of the system, the environment control system is capable of machine learning. In some embodiments of the system, the environmentally-controlled growing chamber comprises a plurality of structures for supporting the plurality of vertical growth columns.

In some embodiments of the system, the light emitting source is laterally-positioned adjacent to the vertical columns comprising the at least one hydroponic plant growth module. In some embodiments of the system, the hydroponic plant growth module comprises a live hinge for detachable fixation to the vertical growth columns. In some embodiments, the hydroponic plant growth module comprises a fixed lip or hinge arrangement for detachable fixation to the vertical growth columns. In some embodiments of the system, the hydroponic plant growth module comprises a (separable) ring for detachable fixation to the vertical growth columns. In some embodiments of the system, the at least one hydroponic plant growth module comprises; a rectangular shape about the sides; a cube shape about its sides; a triangular shape about the sides; a pentagon shape about the sides; a hexagon shape about the sides; a partially circular shape about the sides; a completely circular shape about the sides, a non-flat, irregular shape about the sides; a non-symmetric, irregular shape about its sides; or any combination thereof; wherein one part of a side surface is configured for detachable fixation to the vertical growth columns, and wherein at least one part of a side surface comprises at least one lateral growth opening exposed to the light emitting source. In some embodiments, the at least one hydroponic plant growth module further comprises; an open top surface; a closed top surface; an open bottom surface; a closed bottom surface, a partially open top surface, and a partially closed bottom surface. In some embodiments the at least one hydroponic plant growth module further comprises a drain configured to allow water and nutrients supplied by the nutrient supply system to pass through to another hydroponic plant growth module mounted on the same vertical growth column. In some embodiments of the system, the system further comprises a vertical column loading and unloading system configured to mount and dismount the hydroponic plant growth modules to and from the vertical growth columns. In some embodiments of the system, the system further comprises a plurality of sensors configured to monitor growing conditions in the environmentally-controlled growing chamber, the growing conditions comprising; temperature; humidity; gas content; airflow; flow of the water; flow of the nutrients; quality of light emission from the light source; and a quantity of light emission from the light source; wherein the plurality of sensors provide feedback to the environmental control system, and wherein the environmental control system is capable of adjusting the growing conditions within the environmentally-controlled growing chamber on an as-needed basis. In some embodiments of the system, the master control system, which may be capable of machine learning, further comprises logic capable of regulating and balancing the environmental control system and controlling the conveyance system for any given crop, responsive to at least one identified crop characteristic, in order to optimize the crop characteristic from one crop cycle to the next.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 7C is an illustrative isometric end view of the (optional) superiorly mounted conveyor system of FIGS. 7A and 7B with the addition of a hanger offset adjustment, an intake funnel, an upper air seal, T-baffle and plenum lid.

FIG. 7D is an illustrative end cross-section view of the (optional) superiorly mounted conveyor system of FIGS. 7A and 7B with the addition of a hanger offset adjustment, an intake funnel, an upper air seal, T-baffle and plenum lid.

FIG. 7E illustrates top, front, side and isometric views of the intake funnel illustrated in FIG. 7C.

FIG. 8A is an isometric end view of an inferiorly mounted (optional) conveyor track system and lower air-supply plenum.

FIG. 8B is an isometric end view and side cross-section view of an inferiorly mounted (optional) conveyor track system and lower air-supply plenum.

FIG. 12A is another illustrative isometric view of one of many possible configurations of a hydroponic plant growth module, illustrating a circular design.

FIG. 12B is an illustrative top and side view of the FIG. 12A configuration hydroponic plant growth module.

FIG. 12C is an illustrative top view of an alternative FIG. 12A configuration hydroponic plant growth module, illustrating a circular design comprising a plurality of hydroponic plant sub-module growth modules encased in a larger growth module housing.

FIG. 22A is an illustrative isometric view of a vertical column configuration utilizing a hydroponic plant growth module, with a partially closed upper surface design with a of lateral growth opening, configured for bottom loading/top unloading, into a sleeved collar vertical growth column comprising an optional guided vertical lift mechanism.

FIG. 22B is an illustrative isometric view of a vertical column configuration utilizing a hydroponic plant growth module, with a partially closed upper surface design with a of lateral growth opening, configured for bottom unloading/top loading, into a sleeved collar vertical growth column comprising an optional guided vertical lift mechanism.

DETAILED DESCRIPTION OF THE INVENTION

Figure 1A:
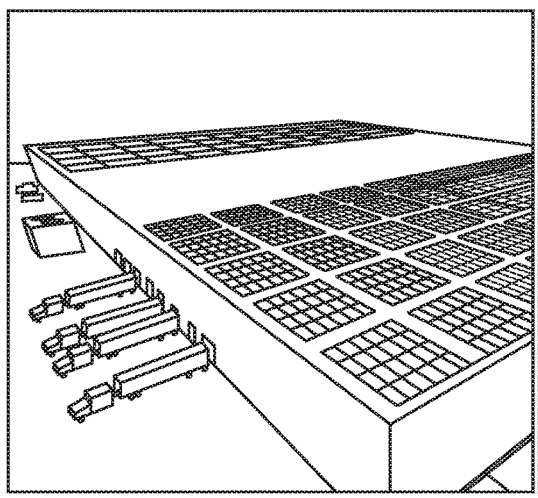
FIG. 1A is an illustrative isometric exterior view of a production farming facility comprising environmentally controlled growing chambers with multi-stage vertical growth systems therein.

Advancements in technology are making it feasible to control the effects of nature with the advent of "controlled indoor agriculture". Improved efficiencies in space utilization, lighting, and a better understanding of hydroponics, aeroponics, crop cycles, and advancements in environmental control systems have allowed man to better recreate environments conducive for agriculture with the goals of greater yields per square foot, better nutrition and lower cost.

A multi-stage, plant growing system is configured for high density growth and crop yields and includes vertical growth columns, an enclosed controlled environmental growth chamber, interchangeable hydroponic plant growth modules, automated lighting, a nutrient supply system, an airflow source and a control system capable of machine learning wherein the crops are optimally spaced and continually staged in their planting cycles to provide an accelerated and continuous annual production yield. The columns are capable of moving about a circuit within the environment to promote automated staging for planting and harvesting activities and the control system is capable of automated adjustments to optimize growing conditions within the growth chamber to make continuous improvements to crop yields, visual appeal and nutrient content.

Combining advances in agriculture with the increasing technological advances of industry acquired since the industrial revolution and more recently, the concept of assembly line automation, the inventors herein have conceived a vertical farming structure 101 in a controlled environment 100, 1000, 1001 having columns comprising automated hydroponic plant growth modules 104, capable of being moved about an automated conveyance system 200(a/b) in a carousel fashion, exposed to controlled lighting 108, airflow provided by an airflow source 400 and humidity, with ideal nutritional support provided by a nutrient supply system 300.

Among those technology advancements is the application of new control systems 600 capable of machine learning, or artificial intelligence, capable of assimilating thousands or even millions of data points acquired by strategically placed sensors 615 during the course of a growing cycle or multiple growing cycles, and further capable of automatically adjusting the growth conditions 610 for a crop 20 on a year-round basis within the controlled environment such as lighting 108, fertilizers (nutrients), moisture, gas levels, temperature, air flow, and ultimately, packaging to produce higher yields at a lower cost per square foot, with reduced overall losses per planted crop, better nutritional value, visual appeal and faster growth cycles.

As used herein, machine learning or artificial intelligence means intelligence exhibited by machines. In computer science, an ideal "intelligent" machine is a flexible rational agent that perceives its environment and takes actions that maximize its chance of success at some goal. Colloquially, the term "artificial intelligence" is applied when a machine mimics "cognitive" functions that humans associate with other human minds, such as "learning" and "problem solving". As machines become increasingly capable, facilities once thought to require intelligence are removed from the definition. For example, optical character recognition is no longer perceived as an exemplar of "artificial intelligence" having become a routine technology. Capabilities still classified as AI include advanced Chess and Go systems and self-driving cars. The central problems (or goals) of AI research include reasoning, knowledge, planning, learning, natural language processing (communication), perception and the ability to move and manipulate objects. General intelligence is among the field's long-term goals. Approaches include statistical methods, computational intelligence, soft computing (e.g. machine learning), and traditional symbolic AI. Many tools are used in AI, including versions of search and mathematical optimization, logic, methods based on probability and economics. The AI field draws upon computer science, mathematics, psychology, linguistics, philosophy, neuroscience and artificial psychology.

The AI system herein comprises various sensors and circuit boards that optionally include a Raspberry Pi (a series of credit card-sized single-board computers) or Arduinos (an open-source prototyping platform) that either through wifi, radio frequency, wires, or other mechanism communicate to a server that can store data in the cloud, or a hard drive, or in a data historian. Humans may play some role in the form of gathering, analyzing, or manipulating this data.

With environmental data such as oxygen levels, humidity, temperature, light penetration, airflow etc. and data points on the crop cycle such as yield, taste, plant health, nutrient intake, etc., the learning possibilities are expanded significantly. Compounding this data within improved horticultural knowledge now makes it possible to attain up to approximately 33 crop cycles in a year per vertical carousel, versus one or two typical growing seasons in outdoor agriculture or approximately eight growing cycles in some greenhouse environments.

Those of skill in the art will recognize that the various illustrative logical blocks, modules, circuits, and algorithm steps described in connection with the embodiments disclosed herein, including with reference to the control systems described herein, for example, may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a Raspberry PI further comprising Arduinos, a plurality of microprocessors, one or more microprocessors in conjunction with a DSP core, or any other such configuration. Software associated with such modules may reside in RAM memory, flash memory, ROM memory, EPROM memory, EEPROM memory, registers, a hard disk, a removable disk, a CD-ROM, or any other suitable form of storage medium known in the art. An exemplary storage medium is coupled to the processor such the processor can read information from, and write information to, the storage medium. In the alternative, the storage medium may be integral to the processor. The processor and the storage medium may reside in an ASIC. For example, in one embodiment, a controller for use of control of the IVT comprises a processor (not shown).

Certain Definitions

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated.

Digital Processing Device

In some embodiments, the Automated Control System and or the Master Control System 600 for the multi-stage, automated growth system described herein includes a digital processing device 635, or use of the same. In further embodiments, the digital processing device includes one or more hardware central processing units (CPU) that carry out the device's functions. In still further embodiments, the digital processing device further comprises an operating system 665 configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft® Xbox 360®, Microsoft Xbox One, Nintendo® Wii®, Nintendo® Wii U®, and Ouya®.

In some embodiments, the device includes a storage and/or memory device 640. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device 635 includes a display 670 to send visual information to a user. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In still further embodiments, the display is a combination of devices such as those disclosed herein.

In some embodiments, the digital processing device 635 includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the Automated Control System and or the Master Control System 600 for the multi-stage, automated growth system disclosed herein includes one or more non-transitory computer readable storage media 645 encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the Automated Control System and or the Master Control System 600 for the multi-stage, automated growth system disclosed herein includes at least one computer program, or use of the same. A computer program includes a sequence of instructions, executable in the digital processing device's CPU, written to perform a specified task. Computer readable instructions may be implemented as program modules 655, 665, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

As used herein, and unless otherwise specified, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 30%, 25%, 20%, 15%, 10%, 9%, 8%, 7%, 6%, 5%, 4%, 3%, 2%, 1%, 0.5%, 0.1%, or 0.05% of a given value or range. In certain embodiments, the term "about" or "approximately" means within 40.0 mm, 30.0 mm, 20.0 mm, 10.0 mm 5.0 mm 1.0 mm, 0.9 mm, 0.8 mm, 0.7 mm, 0.6 mm, 0.5 mm, 0.4 mm, 0.3 mm, 0.2 mm or 0.1 mm of a given value or range. In certain embodiments, the term "about" or "approximately" means within 20.0 degrees, 15.0 degrees, 10.0 degrees, 9.0 degrees, 8.0 degrees, 7.0 degrees, 6.0 degrees, 5.0 degrees, 4.0 degrees, 3.0 degrees, 2.0 degrees, 1.0 degrees, 0.9 degrees, 0.8 degrees, 0.7 degrees, 0.6 degrees, 0.5 degrees, 0.4 degrees, 0.3 degrees, 0.2 degrees, 0.1 degrees, 0.09 degrees. 0.08 degrees, 0.07 degrees, 0.06 degrees, 0.05 degrees, 0.04 degrees, 0.03 degrees, 0.02 degrees or 0.01 degrees of a given value or range.

As used herein, the terms "connected", "operationally connected", "coupled", "operationally coupled", "operationally linked", "operably connected", "operably coupled", "operably linked," and like terms, refer to a relationship (mechanical, linkage, coupling, etc.) between elements whereby operation of one element results in a corresponding, following, or simultaneous operation or actuation of a second element. It is noted that in using said terms to describe inventive embodiments, specific structures or mechanisms that link or couple the elements are typically described. However, unless otherwise specifically stated, when one of said terms is used, the term indicates that the actual linkage or coupling may take a variety of forms, which in certain instances will be readily apparent to a person of ordinary skill in the relevant technology.

For description purposes, the term "radial" is used here to indicate a direction or position that is perpendicular relative to a longitudinal axis.

The term "axial" as used here refers to a direction or position along an axis that is parallel to a main or longitudinal axis. For clarity and conciseness, at times similar components labeled similarly (for example, axis 1011A and axis 1011B) will be referred to collectively by a single label (for example, axis 1011).

As used herein, and unless otherwise specified, the term "anterior" means the front surface of an apparatus or structure; often used to indicate the position of one structure relative to another, that is, situated nearer the front part of an apparatus or structure.

As used herein, and unless otherwise specified, the term "posterior" means the back surface of an apparatus or structure; Often used to indicate the position of one structure relative to another, that is, nearer the back of an apparatus or structure.

As used herein, and unless otherwise specified, the term "superior" refers to an apparatus or structure and means situated above or nearer the vertex of the head in relation to a specific reference point; opposite of inferior. It may also mean situated above or directed upward.

As used herein, and unless otherwise specified, the term "inferior" refers to an apparatus or structure and means situated nearer the soles of the feet in relation to a specific reference point; opposite of superior. It may also mean situated below or directed downward.

As used herein, and unless otherwise specified, the term "lateral" means denoting a position farther from the median plane or midline of an apparatus or a structure. It may also mean "pertaining to a side".

As used herein and unless otherwise specified, the term "medial" means, situated toward the median plane or midline of an apparatus or structure.

As used herein, the terms "comprises", "comprising", or any other variation thereof, are intended to cover a nonexclusive inclusion, such that a process, method, article, or apparatus that comprises a list of elements does not include only those elements but may include other elements not expressly listed or inherent to such process, method, article, or apparatus.

As used herein, the term "vertical growth assembly" means a tower assembly comprising a plurality of hydroponic plant growth modules, or alternately means a vertical column or vertical growth column comprising a plurality of hydroponic plant growth modules. The tower assembly comprises either a supported tower or an unsupported, self-standing tower. The vertical column typically comprises a vertical support member having a plurality of hydroponic plant growth modules affixed thereto. The vertical support member may affix to an outer edge of a growth module container, a spacer module, a sensor module or through an interior portion thereof.

As used herein, "light intensity" refers to or photosynthetically active radiation [PAR] or photosynthetic photon flux density (PPFD). PPFD is a measured metric whereas PAR is a descriptive term for a range of wavelengths.

Control and Sensor Systems of the Present Disclosure

Provided herein is a plant growing system configured for high density growth and crop yield, the system comprising: an environmentally-controlled growing chamber; a vertical growth column, within the growing chamber, configured to support one or more hydroponic plant growth modules; each hydroponic plant growth module configured for: containing and supporting hydroponic plant growth media for containing and supporting a root structure of at least one crop plant growing therein, the at least one crop plant being of a gravitropic plant species; and detachably mounting to the vertical growth column, each hydroponic plant growth module comprising: a lateral growth opening configured to allow the at least one growing crop plant to grow through the growth opening in a lateral direction of growth when the hydroponic plant growth module is mounted to one of the vertical growth columns; and an upper and a lower opening, each configured to allow an aqueous crop nutrient solution to flow therethrough; a light emitting source positioned laterally from the lateral growth opening of one of the hydroponic plant growth modules when the one hydroponic plant growth module is mounted to the one vertical growth column, the light emitting source configured to emit light toward the lateral growth opening in a direction generally opposite to the lateral direction of growth, to thereby at least partly suppress gravitropism in the growing plant and to encourage the plant to grow from the lateral growth opening in the lateral direction of growth; a nutrient supply system configured to direct the aqueous crop nutrient solution through the upper opening of the one hydroponic plant growth module when mounted to the one vertical growth column; an airflow source configured to, when the one hydroponic plant growth module is mounted to the one vertical growth column, direct airflow away from the lateral growth opening in the lateral growth direction of growth and through an under-canopy of the growing plant, so as to disturb the boundary layer of the under-canopy of the growing plant; a control system for regulating, when the hydroponic plant growth module is mounted to the one vertical growth column, at least one growing condition in an area in or adjacent to the under-canopy, the at least one growing condition selected from the group consisting of: air temperature, airflow speed, relative air humidity, and ambient carbon dioxide gas content; and a conveyance system for moving the one vertical growth column in a circuit within the environmentally-controlled growing chamber throughout the plant's growth cycle, the circuit comprising a staging area configured for loading plants into, and harvesting crops from, the hydropic plant growth modules.

Figure 1B:
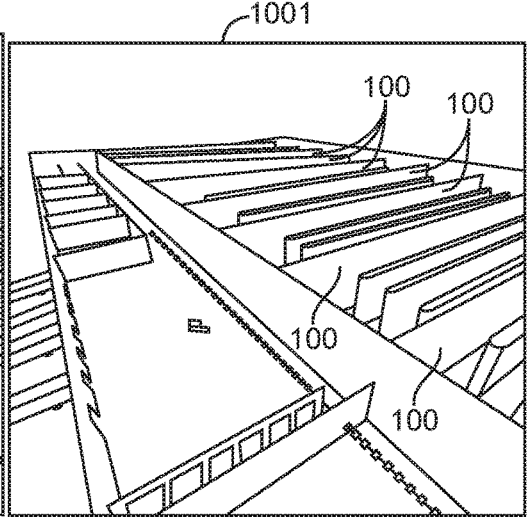
FIG. 1B is an illustrative isometric exterior cut-away view of a production farming facility comprising environmentally controlled growing chambers with multi-stage vertical growth systems therein.
Figure 2:
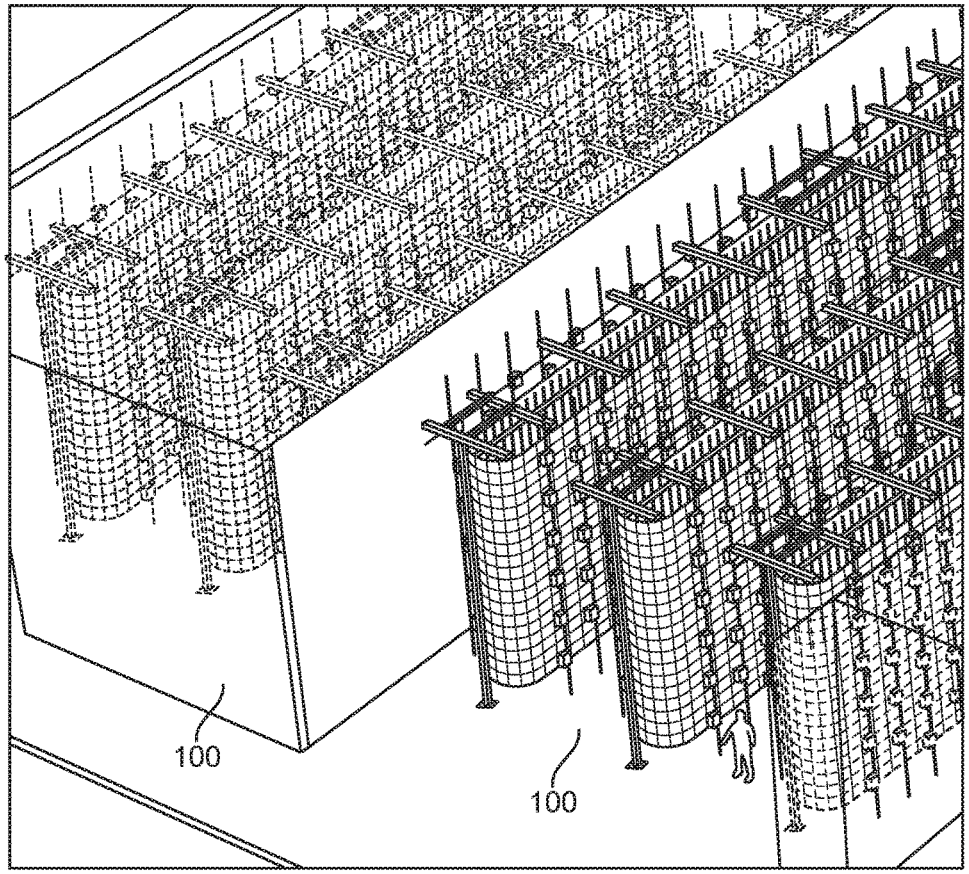
FIG. 2 is an illustrative isometric view of several multi-stage vertical growth systems within one of the environmentally controlled growing chambers.

In a first broad aspect, provided herein is a control system for a vertical farming system. The control system is optionally configured for manual implementation by a human operator or computer-implemented control. The vertical farming system includes a hydroponic plant growth module in an environmentally-controlled growing chamber 100, which can be, for example a greenhouse. FIGS. 1A and 1B depict external views of commercial greenhouse-type farming facilities 1000, 1001 which contain exemplary growing chambers 100 as shown in FIG. 2 for use with the control systems of the present disclosure. As described in subsequent FIGS. 20, 21A & 21B, the control system 600 includes one or more sensors 615 or measuring devices, which measure one or more environmental growing conditions in the environmentally-controlled growing chamber over time, to generate environmental condition data. A sensor is, for example, an air temperature sensor, a humidity sensor, or a sensor for measuring gaseous carbon dioxide content. The sensors or measuring devices may also measure numerous other environmental conditions, including air pressure, air flow, gaseous oxygen content, light quality (e.g.: spectral properties of natural or artificial light), and/or light quantity (e.g.: light intensity or length of light/dark cycles). Alternatively or additionally, the sensors may measure one or more properties of an aqueous nutrient solution that is optionally provided to one or more crops growing in the vertical farming system. These properties may include temperature, dissolved oxygen and/or carbon dioxide content, nutrient content (e.g.: content of one or more of zinc, molybdenum, manganese, iron, copper, chlorine, boron, sulfur, magnesium, calcium, potassium, phosphorus, and nitrogen), pH, oxygen reduction potential, or electrical conductivity. In addition or alternatively, the sensor may also measure a rate of movement or velocities of growing plants, for example, as such plants are moved up or down a vertical growth tower, and/or around a growing circuit in the vertical farming system. In some systems, the sensor may include a sensor array 30, suitable for measuring any combination of environmental growing conditions, including any possible combination of the conditions described in this paragraph. An exemplary sensor is depicted at FIGS. 23A through 24, adapted for placement in the hydroponic plant growth module, spacer module or sensor module 104/105/110 as depicted in exemplary FIG. 10A or 10B.

Figure 23A:
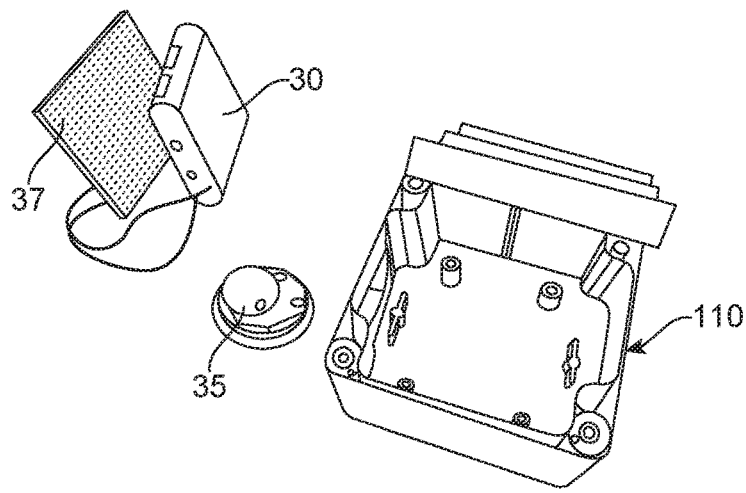
FIG. 23A is an illustrative top view of a hydroponic plant growth module configured for containing a sensor unit including sensors for sensing one or more environmental growing conditions.
Figure 23B:
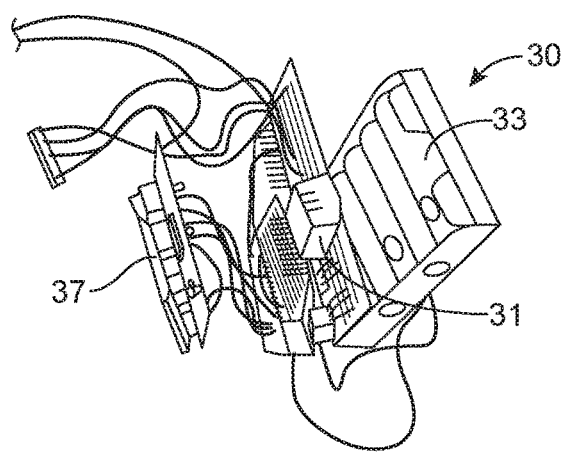
FIG. 23B is an illustrative view of a sensor unit including sensors for sensing one or more environmental growing conditions.
Figure 23C:
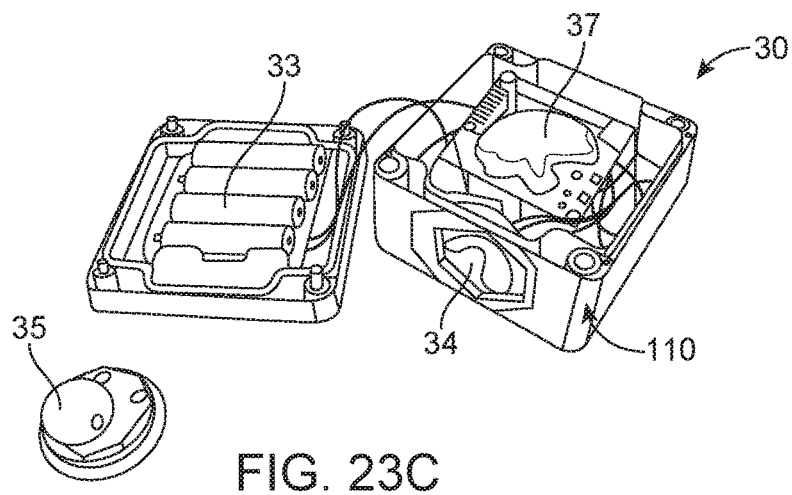
FIG. 23C is an illustrative view of a sensor module containing a sensor unit including sensors for sensing one or more environmental growing conditions.
Figure 24:
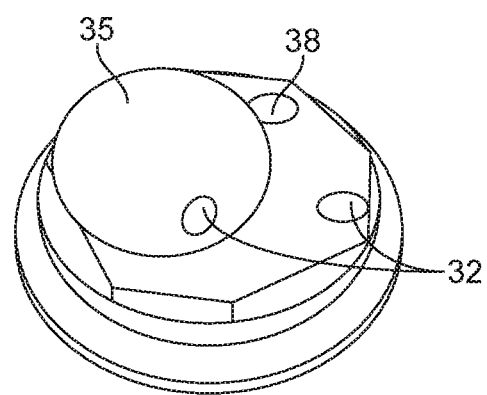
FIG. 24 is an illustrative view of a device for placement over an opening of a sensor module and having apertures therethrough allowing for one or more sensors to protrude therefrom.

As depicted in FIGS. 23A through 24, the sensor system comprises a sensor module 110, a sensor circuit board 31, a sensor mounting port 32, a sensor battery pack 33, a sensor nose mount 34, a sensor nose 35, a sensor circuit mounting board 37 configurable for mounting a sensor 615 (not shown) or a crop characteristic measuring device 625 (not shown) and a digital imaging device/crop characteristic device mounting port 38.

The sensor may measure the environmental growing condition(s) continually, or at defined intervals during the growing cycle of the crop plant grown in the vertical farming system. The environmental growing condition data generated by the sensor may, for example, provide a "fingerprint" corresponding to one or more environmental conditions experienced by a growing crop plant as it grows over time, for example, from planting until the time of harvest. Alternatively, the data may be measured and recorded during two or more discrete time points during the course of the plant's growth.

The vertical farming system also includes one or more crop characteristic measuring devices 625 for measuring the characteristic of a crop grown in the hydroponic plant growth module. The device may be a digital imaging device, such as a digital camera, suitable for capturing images of growing crop plants to calculate leaf area indices (LAI). Alternative devices may be capable of measuring the weight, sugar content, water content, acidity, or other properties of the crop plant to generate crop characteristic data. The devices may be positionable within the vertical farming system to measure the plant during growth, and/or after harvest. For example, a digital imaging apparatus may be stationary, and positioned to capture digital images of crop plants as they pass by on a growth circuit. Alternatively, the apparatus may be mounted to a drone which flies about the vertical farming system captures images of growing plants.

Figure 20:
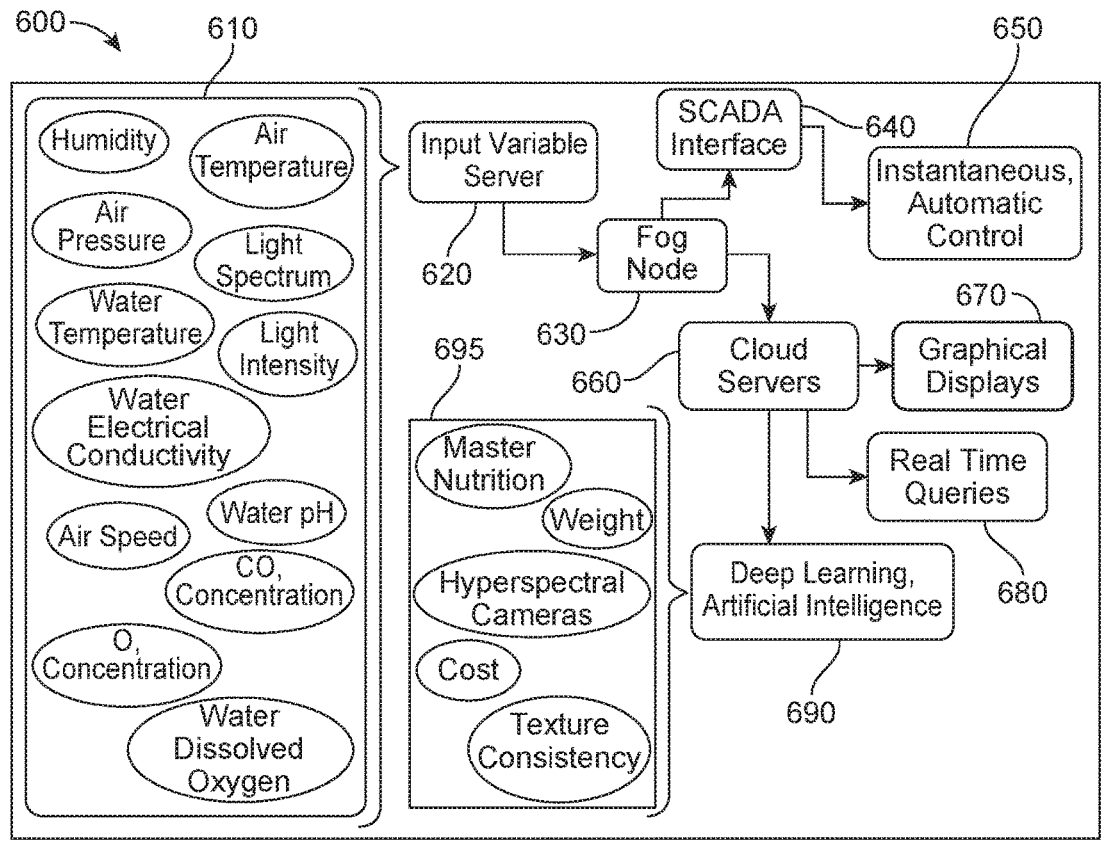
FIG. 20 is an illustrative schematic of the machine learning capability and system controls associated with the automated master control system.
Figure 21A:
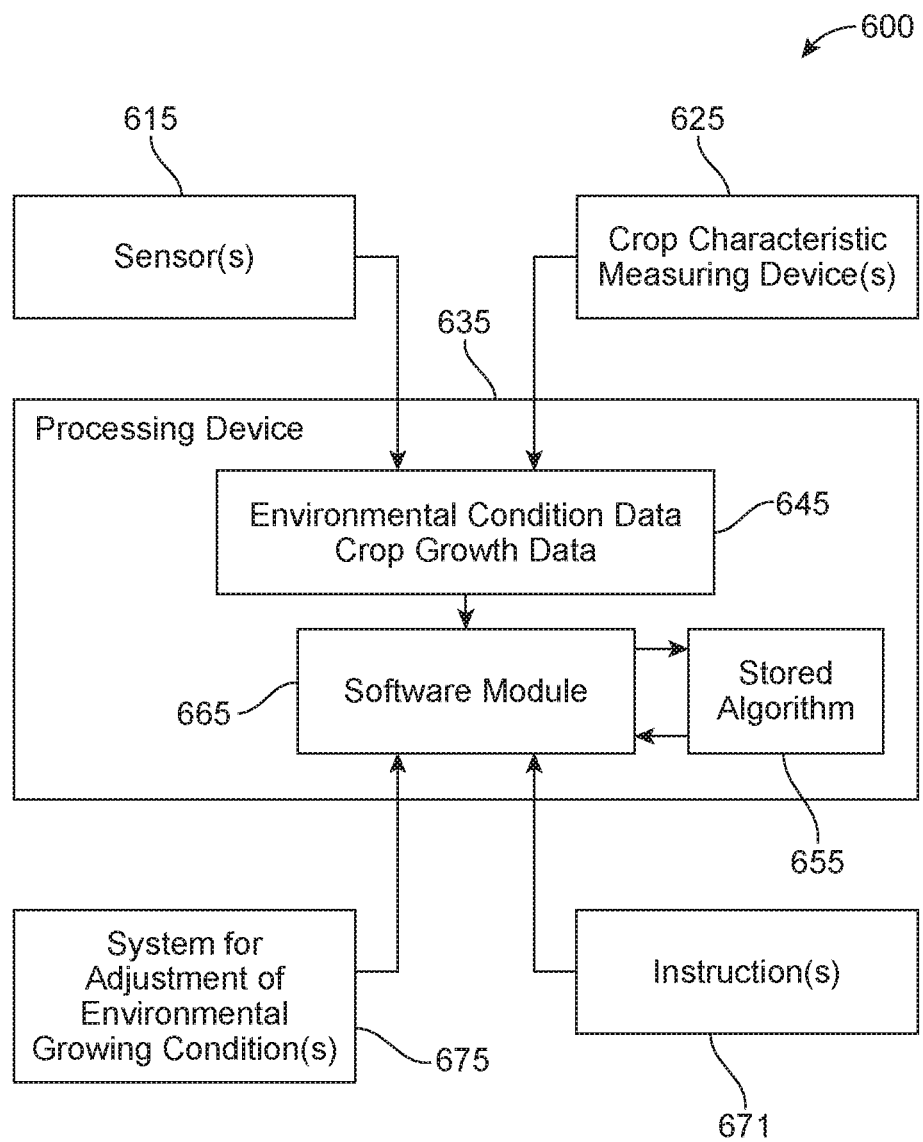
FIG. 21A is an illustrative schematic of a control system configured for automatic and routine manual inputs of commands to control the environmental growing conditions of the growing chamber.
Figure 21B:
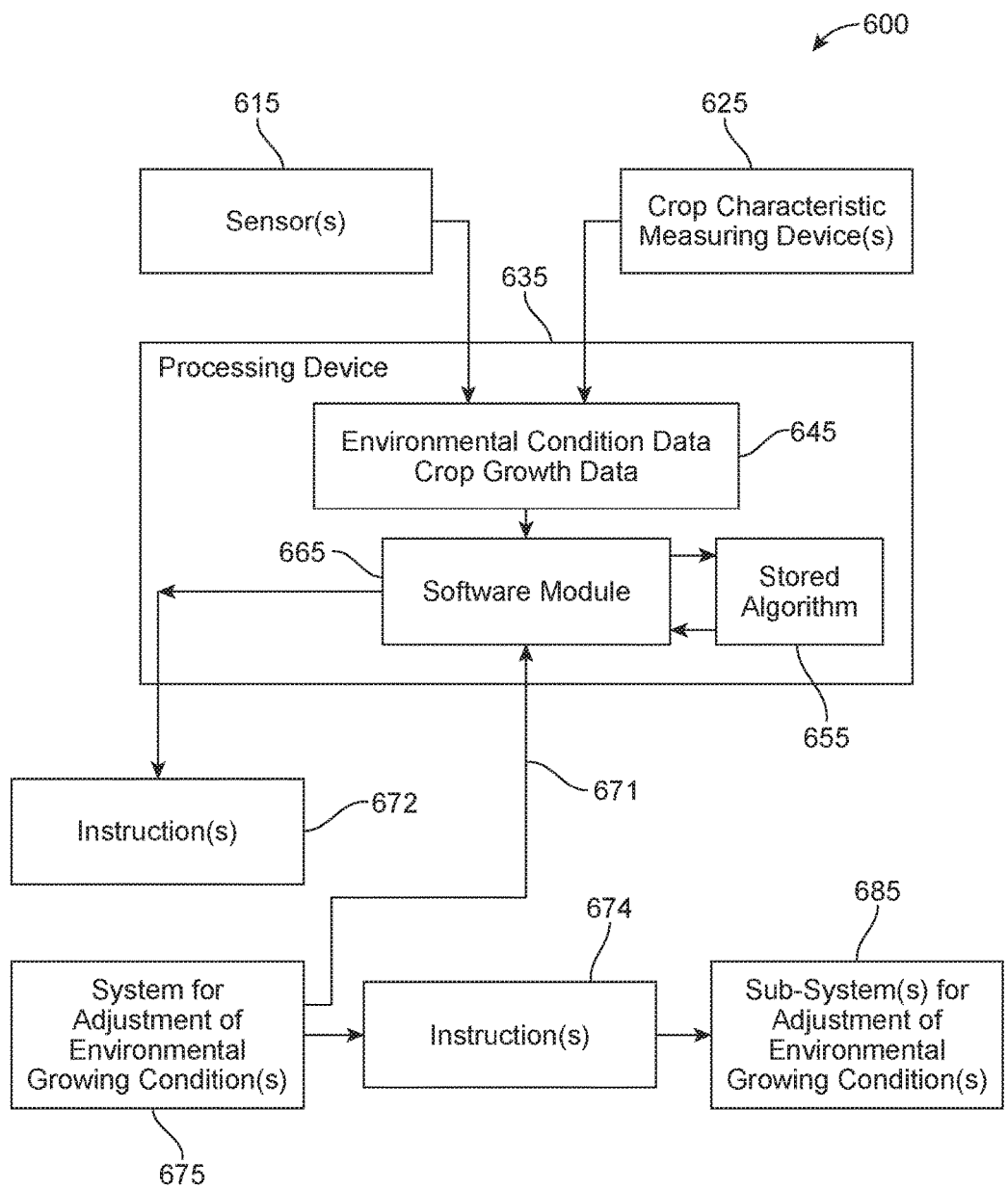
FIG. 21B is an illustrative schematic of a control system configured for full automated control of the environmental growing conditions of the growing chamber by an artificial intelligence-controlled software module, not requiring routine manual inputs.

As depicted in FIGS. 20, 21A & 21B the vertical farming system also includes a processing device, which includes a processor, a memory, an operating system configured to perform executable instructions, and a computer program. The processing device may also include a receiver, for receiving transmitted data, and/or a transmitter, for transmitting data. The receiver and transmitter may be configured for wired, and/or wireless receipt or transmission of data. The computer program includes instructions which may be executed by the processing device to create an application. The application includes a software module, which is configured to receive environmental condition data generated by the sensor(s), and crop characteristic data generated by the device(s) apply an algorithm to the environmental condition data and the crop characteristic data and generate one or more improved environmental growing condition(s). The processing device also includes a software module that generates instructions to adjust and improve the environmental growing condition(s) in or around the hydroponic plant growth module.

In a simple and non-limiting example, the algorithm may be applied to detect a correlation between a measured increase in air temperature and an increase in a calculated leaf area indices, update the environmental growing condition's set optimal temperature and generate instructions for adjusting the temperature in or around the hydroponic plant growth module. The hydroponic plant growth module temperature could then be adjusted, either automatically, or with human intervention.

In other examples, the measured crop characteristic may correlate with a decrease in leaf area index, and instructions would be generated for reducing the environmental growing condition's set optimal temperature and generating instructions for adjusting the temperature in or around the hydroponic plant growth module. In some examples, a plurality of two, three, or four or more environmental conditions could be measured during the crop cycle, whereas the algorithm would correlate to measure data conditions and generate improved growing conditions for each of the measured conditions. For example, instructions for adjustment to improved levels of any combination of air temperature, humidity, gaseous carbon dioxide, and/or any combination of characteristics of an aqueous nutrient solution may be generated.

The control system may include one or more software modules configured for regulating one or more environmental characteristics including: temperature, humidity, gaseous or aqueous $CO_2$ or $O_2$ content, airflow, air pressure, flow of water and nutrients, aqueous nutrient concentration of an aqueous nutrient solution, aqueous pH, water or aqueous oxidation reduction potential (ORP), aqueous electrical conductivity (EC), a quality or a quantity of light emission from a light source, and movement of hydroponic plant growth modules around a growing circuit.

As noted originally in this disclosure, the inventors have incorporated the utilization of machine learning into this environmentally controlled vertical farming system. Along with the application of new control systems capable of machine learning, or artificial intelligence (AI), the system's capabilities are further enhanced with the ability to accurately track each of the plants in a growth module in the system, utilizing tracking and monitor devices such as visual monitoring devices (cameras) among other systems, as well as overall ambient environment and other locally critical data points within each growth module, during the course of a growing cycle or multiple growing cycles, through the assimilation of thousands or even millions of data points acquired from strategically placed sensors. Armed with this data and the ability to learn and adjust, the AI control system is further capable of automatically adjusting year-round crop growth conditions within the controlled environment; such as lighting, fertilizers (nutrients), moisture, gas levels, temperature, air flow, and ultimately, packaging, to produce higher yields at a lower cost per square foot due to plants' vertical growth and increased space efficiency, with reduced overall losses per planted crop, better nutritional value, visual appeal and faster growth cycles. Data collected and transmitted to the AI control system comprises, but is not limited to nutrient concentrations; water pH; water electrical conductivity (EC); $O_2$ gas level concentrations; $CO_2$ gas level concentrations; $O_2$ dissolved in water; water oxidation reduction potential (ORP); water temperature; water flow rate; air temperature; environmental ambient air speed; light spectrum; light intensity (photosynthetically active radiation [PAR] or photosynthetic photon flux density (PPFD)); air pressure; air speed; and humidity.

The sensor(s) may be configured for placement in a sensor unit, which itself in configured for placement in a separate hydroponic plant growth module, which may or may not include a growing plant therein. A second "dummy" growth module, to and/or within which the sensor is mounted, may be configured to stackably support other hydroponic plant growth modules above or below itself within a vertical growth tower, within the vertical growth system.

In some examples, numerous sensors are distributed about the environmentally-controlled growing chamber to provide environmental data corresponding with their individual positions. In some examples, sensors are distributed about one or more vertical growth towers, each corresponding with a position of a hydroponic plant growth module within the growth tower. In preferred examples, a sufficient number of sensors is used such that environmental data (corresponding with one or more environmental condition(s) generated by this plurality of sensors such that the environmental condition(s) at any position within the tower (or within the system) may be predicted with 95% statistical confidence.

In a second broad aspect, further provided herein is a sensor system for measuring two or more crop growing conditions in an environmentally-controlled growth system, for example a greenhouse. FIGS. 1A and 1B depict external views of commercial greenhouse-type facilities 1000, 1001 with exemplary growing chambers 100 as shown in FIG. 2 for use with control systems of the present disclosure. The sensor system 600 includes a sensor unit 615, which is configured to be mounted in, or on, a hydroponic plant growth module 104 in a vertical growth tower or column 102 within the growth system. The growth module 104 is configured to stackably support one or more other hydroponic plant growth modules, above and/or below itself in the vertical growth tower. The hydroponic plant growth module is also configured to permit vertical flow of an aqueous crop nutrient solution, for example a solution typically used in hydroponic agriculture, to another hydroponic plant growth module below itself within the tower. For example, the hydroponic plant growth module may have an aperture or drain 13 that allows for flow of the solution through the module, or it may permit the solution to flow around and/or over itself, down toward a module below. The hydroponic plant growth module may itself be configured appropriately to contain a growing crop plant. The hydroponic plant module has a lateral growth opening 106 which allows a plant 20 to grow laterally from the module, with roots housed in the module. Alternatively, the module may be a "dummy" or a "spacer" module 105, which is representative of other hydroponic plant growth modules in terms of stackability and permission of nutrient solution vertical flow, but is not itself configured to contain a growing plant. Further still, the module may be a "sensor" module 110, which is representative of other hydroponic plant growth modules 104 or spacer modules 105 in terms of stackability and permission of nutrient solution vertical flow, but with the purpose of housing a sensor array.

The sensor unit or sensor array 30 comprising individual specialized sensors, sensing devices, crop characteristic measuring device 625 and/or digital image systems, is mounted in, to and/or on the hydroponic plant growth module 104 or sensor module 110, and measures and collects input data that corresponds with a crop growing condition outside of the hydroponic plant growth module at a plant canopy level. The plant canopy level can be defined by the area in which a growing plant canopy exists where the plant is growing out of an opening in the hydroponic plant growth module, or b) the region in space corresponding with where a growing plant's canopy would be, if the hydroponic plant growth module did contain a growing plant. An exemplary sensor or sensor array 30 is depicted at FIGS. 23A through 24, adapted for placement in the growth, sensor or spacer module 104/105/110 as depicted in exemplary FIG. 10A or 10B.

By way of non-limiting example, in cases where hydroponic plant growth modules in the vertical growth tower are adapted to house a growing lettuce plant, an area adjacent to each hydroponic plant growth module will correspond with an area of plant canopy for each growing lettuce plant. The area may be, for example, adjacent to a lateral growth opening 106 in the hydroponic plant growth module 104. The area may occupy approximately the area of one growing lettuce (or other plant species, as appropriate) plant. The area may occupy a region in space comprising, for example, about a 3" 6", 9", 12", 15", 18", 21", or 24" layer adjacent to the hydroponic plant growth module. In any case, the sensor unit 110 is configured to measure and collect input data corresponding with a first crop growing condition at the plant canopy level, outside of the hydroponic plant growth module.

Figure 18:
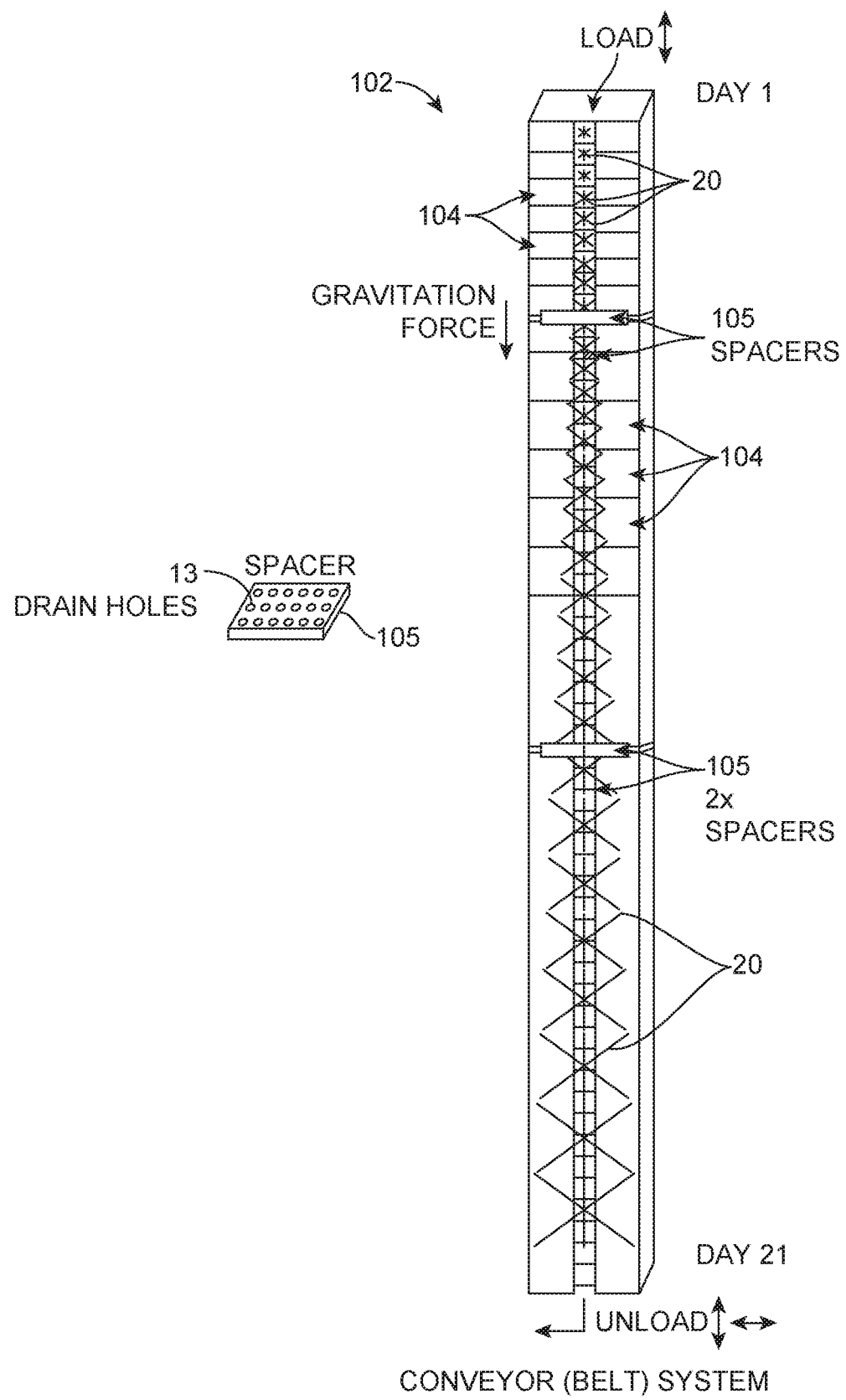
FIG. 18 is a schematic of a vertical column structure illustrating possible spacing configurations of hydroponic plant growth modules and spacers depending on loading and unloading schemes, the growth cycle of the crop as it could relate to a loading/unloading scheme, the size of the plant in each hydroponic plant growth module and the weight of the growth modules.

As would now be obvious to one skilled in the art, spacer modules 105 could be stacked above, below and between sensor modules 110, and hydroponic plant growth modules 104 to create adequate growth areas and under-canopy spacing between growing plants during the growth cycle. Additionally, the intra-growth module space could be increased during the growth cycle, as needed to accommodate extra growth and to optimize logistical spacing in the growth column during the growth cycle. By way of non-limiting example, in cases where hydroponic plant growth modules in the vertical growth tower are adapted to house a growing plant that ultimately requires additional spacing between hydroponic plant growth modules during the growth cycle, FIG. 18 illustrates where spacer modules 105 (and/or sensor modules 110) are configured to be placed in single or multiple layers between hydroponic plant growth modules. The placement of these additional modules can occur at any time in the growth cycle, in the initial seeding stages, or during the middle or later growth stages, using either manual or automated loading and conveyor systems as will be described hereinafter.

At least one growing condition measured at the plant canopy level comprises temperature, humidity, and/or carbon dioxide levels, and the sensor unit may accordingly comprise a temperature sensor (thermometer), a carbon dioxide sensor, and/or a humidity sensor or hygrometer. Monitoring each of these growing conditions at the plant canopy level is thought to be important for measuring the likely health of a growing crop plant. The sensor unit 30 may also comprise one or more of an ambient air speed sensor, an air pressure sensor, or a sensor for measuring light quality or quantity, at the plant canopy level.

The sensor unit or sensor array 30 is also configured to measure and collect input data corresponding with at least one other, or "second" crop growing condition. One such "second" crop growing condition is a measured characteristic of the aqueous crop nutrient solution supplied by the nutrient supply system 300. In the vertical farming system, nutrients and water are supplied to the growing plants (housed within the hydroponic plant growth modules, themselves stacked within the vertical growth towers) in an aqueous crop nutrient solution. Such crop nutrient solutions possess numerous measurable and quantifiable characteristics, one or more of which may be measured by the sensor 615. For example, the sensor unit 30 may comprise one or more of a nutrient concentration sensor, an aqueous pH sensor, an aqueous electrical conductivity (EC) sensor, an aqueous dissolved $O_2$ concentration sensor, an aqueous dissolved $CO_2$ concentration sensor, a water oxidation reduction potential (ORP) sensor, a water temperature sensor, and a water flow rate sensor. Such sensors may be configured for placement in or on the hydroponic plant growth module 104 and positioned to measure and collect input data corresponding to the measured characteristic of the aqueous crop nutrient solution. In examples where the sensor unit includes a nutrient concentration sensor, this sensor may be configured to sense concentration, in the nutrient solution, concentrations comprising zinc, molybdenum, manganese, iron, copper, chlorine, boron, sulfur, magnesium, calcium, potassium, phosphorus, and nitrogen. The sensors 615 located outside of the sensor module 110, such as those positioned in or on the hydroponic plant growth module(s) 104, are configurable for wired or wireless transmission of collected data back to the sensor array 30 in the sensor module 110.

In some examples, the sensor array 30 or sensor module system 110 also includes a transmitter, which transmits (wirelessly and/or by wire) the collected input data to a master box (not shown), within the master control system 600, which collects, organizes, and collates the received data. The master box may comprise a wireless receiver, for receiving the transmitted input data from the sensor units, a digital processing device, which includes an operating system configured to perform executable instructions, a memory and a computer program which instructs the digital processing device to collect, organize and collate the input data, and to transmit the collated input data to a computer-implemented automated control system. The master control system 600 may be additionally configured to calculate one or more crop growing conditions in the environmentally controlled growth environment in response to the collated input data. The master box may itself also include a transmitter, for transmission of the calculated crop growing conditions to the automated control system.

In some examples, the sensor module unit 110 is waterproof or water resistant. With reference to FIGS. 23A through 24, the sensor module unit 110 includes a waterproof "nose" 35 configured for placement over an opening 34 of a sensor module, which may be made of plastic or some other suitable material, the nose 35 including one, or more apertures, such as 32 or 38. Protruding from the apertures in the "nose" may be one or more sensors, which sense one or more environmental conditions 610, such as temperature, humidity, or carbon dioxide content at the plant canopy level. The sensor unit 30 may be adapted to fit within a plant growth unit 104, through which nutrient solution flows during plant growth. In such examples, the sensor unit 30 may include one or more sensors 615 which sense the "second" crop growth condition (of the nutrient solution) inside the growth unit, while also including one or more sensors 615 protruding from a growth opening in the growth unit, positioned in space corresponding with where a growing plant canopy would be, which sense the "first" growth condition at the plant canopy level.

In some examples, the sensor unit 30 may be adapted to fit within a plant growth unit, and further be fitted with an input device, crop characteristic measuring device 625 or a digital image capturing device, such as a digital camera (not shown), suitable for capturing images of growing crop plants. In such examples, the sensor unit 30 may further comprise a microphone (not shown) to capture voice, air movement, insect sounds or other sound input. In other embodiments, the input device is a video camera or other sensor 615 to capture motion or visual input. In further embodiments, the input device is a Kinect, Leap Motion, or the like. In still further embodiments, the input device is a light sensor or digital light meter (not shown). In still further embodiments, the input device is a combination of devices such as those disclosed herein.

In some embodiments, the control system regulates at least a second growing condition 610 selected from the group comprising: temperature of the aqueous crop nutrient solution, pH of the aqueous crop nutrient solution, electrical conductivity of the aqueous crop nutrient solution, flow rate of the aqueous crop nutrient solution, quality of light emission from the light emitting source, and quantity of light emission from the light emitting source.

As illustrated in FIGS. 1A, 1B, 2 and 3 provided herein is a plant growing system comprising a vertical farming structure 101 in a controlled environment 1000, 1001 configured for high density crop growth and yield, the system comprising: an environmentally-controlled growing chamber or growth chambers 100; a vertical growth column 102 optionally supported by columnar support structures 103, within the growing chamber 100, configured to support a hydroponic plant growth module 104; the hydroponic plant growth module 104 is configured for: containing and supporting hydroponic plant growth media, for containing and supporting a root structure of at least one crop plant 20 growing therein; the at least one crop plant being of a gravitropic plant species, wherein the plants roots grow generally in the direction of gravitational pull (i.e., downward) and stems grow generally in the opposite direction (i.e., upwards). As further illustrated in FIGS. 10A, 10B, 11A and 11B, the hydroponic plant growth module 104 is further configured to detachably mount to the vertical growth column 102, the hydroponic plant growth module comprising: a lateral growth opening 106 configured to allow the at least one growing crop plant 20 to grow through the growth opening in a lateral direction of growth when the hydroponic plant growth module is mounted to one of the vertical growth columns; and an upper and a lower opening 11, 12, and optionally, one or more drains 13, each configured to allow an aqueous crop nutrient solution to flow therethrough. Further still as illustrated in FIGS. 3, 4, 5 and 6, the system comprises a light emitting source 108 positioned laterally from the lateral growth opening when the hydroponic plant growth module is mounted to the vertical growth column, the light emitting source configured to emit light toward the lateral growth opening in a direction generally opposite to the lateral direction of growth, to thereby at least partly suppress gravitropism in the growing plant and to encourage the plant to grow from the lateral growth opening in the lateral direction of growth. The system further comprises: a nutrient supply system 300, configured to direct the aqueous crop nutrient solution through the upper opening 11 of the hydroponic plant growth module 104 when mounted to the vertical growth column; an airflow source 400, configured to, when the hydroponic plant growth module is mounted to the vertical growth column, direct airflow away from the lateral growth opening 106 in the lateral growth direction of growth and through an under-canopy of the growing plant, the area immediately below the laterally protruding plant crop, so as to disturb the boundary layer of the under-canopy of the growing plant; and a control system 600, for regulating, when the hydroponic plant growth module is mounted to the vertical growth column, at least one growing condition in an area in or adjacent to the under-canopy, the at least one growing condition selected from the group consisting of: air temperature, airflow, relative air humidity, and ambient carbon dioxide gas content.

In some embodiments, the plant growing system further comprises a plenum (not shown) to receive and direct air from the airflow source, wherein the airflow source is a forced airflow, further wherein the plenum comprises a plurality of ducts (not shown) configured to, direct airflow away from the lateral growth opening in the lateral growth direction of growth and through an under-canopy of the growing plant, when the module is mounted to the vertical growth column, so as to disturb the boundary layer of the under-canopy of the growing plant.

Figure 10A:
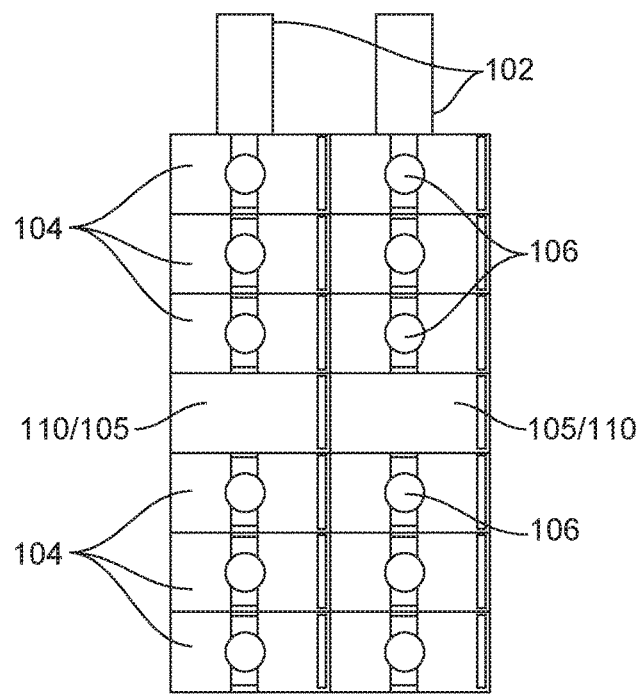
FIG. 10A is a front view of side-by-side vertical growth columns with illustrative representations of stacked hydroponic plant growth modules comprising at least one lateral growth opening and with intermittent space/sensor modules placed between groups of hydroponic plant growth modules in the vertical column.
Figure 10B:
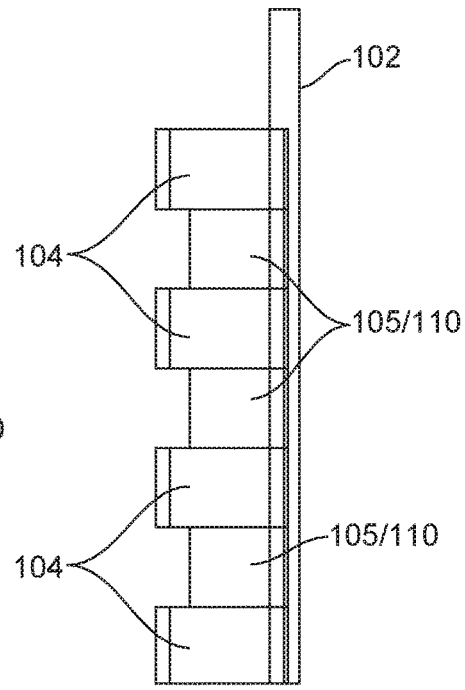
FIG. 10B is a side view of a vertical growth column with illustrative representations of stacked hydroponic plant growth modules comprising at least one lateral growth opening and intermittent spacer/sensor modules placed between the hydroponic plant growth modules in the vertical column in a different arrangement.

In some embodiments, as illustrated in FIGS. 10A and 10B, the plant growing system is further configured to stackably support one or more other hydroponic plant growth modules 104 mounted to the vertical column either above and/or below itself. In some embodiments, the hydroponic plant growth modules are separated or configured to be separated by spacer modules 105 and/or sensor modules 110

In some embodiments, the hydroponic plant growth module is further configured to: receive a vertical flow of the aqueous crop nutrient solution through the upper opening 11 or drain holes 13, from another hydroponic plant growth module 104, spacer 105 or sensor module 110 mounted to the vertical column above itself, and or through the lower opening 12 or drain holes 13, to another hydroponic plant growth module 104, spacer 105 or sensor module 110 mounted to the vertical column below itself.

Similar activity is anticipated for airflow which can be directed into, through and around the hydroponic plant growth modules. Both nutrient flow and airflow can be directed into the top of each vertical growth column and hydroponic plant growth modules through optionally configured airflow/nutrient flow guide buckets 206 as illustrated in FIGS. 7C, 7D and 7E. Nutrient flow is configured for gravitational flow through the hydroponic plant growth modules, whereas collection of excess or residual nutrient flow is collected in the water/nutrient drip collection/return pan 330 which is typically located in an open space 107 in, under or near the center of the vertical growth system structure 101.

As shown in more detail and in a non-limiting configurations in FIGS. 11A and 11B, and 12A through 12C, the hydroponic plant growth module 104, spacer 105 or sensor module 110 are configured to be mounted to the vertical column through one or a combination of fixed attachment features 109, such as hinges, wires, through-holes, bayonette features, suspension cables, notched steps or grooves. In some embodiments of the system, the hydroponic plant growth module additionally comprises a live hinge for detachable fixation to the vertical growth columns. In some embodiments, the hydroponic plant growth module additionally comprises a fixed lip or hinge arrangement or a (separable) ring for detachable fixation to the vertical growth columns.

Figure 11A:
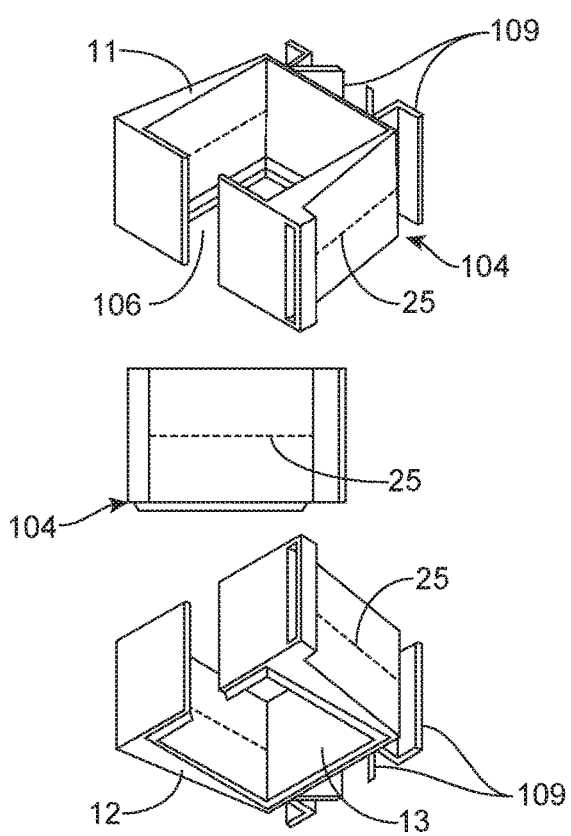
FIG. 11A is an illustrative top isometric, side and bottom isometric view of one of many possible configurations of a hydroponic plant growth module (cube with open top and bottom), illustrating a V-baffle hinge connection, one of many possible hinge configurations.
Figure 11B:
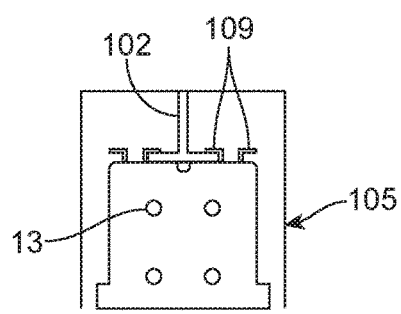
FIG. 11B is an illustrative top view of a spacer/sensor module illustrating a T-baffle hinge connection on a vertical column, one of many possible hinge configurations.
Figure 13:
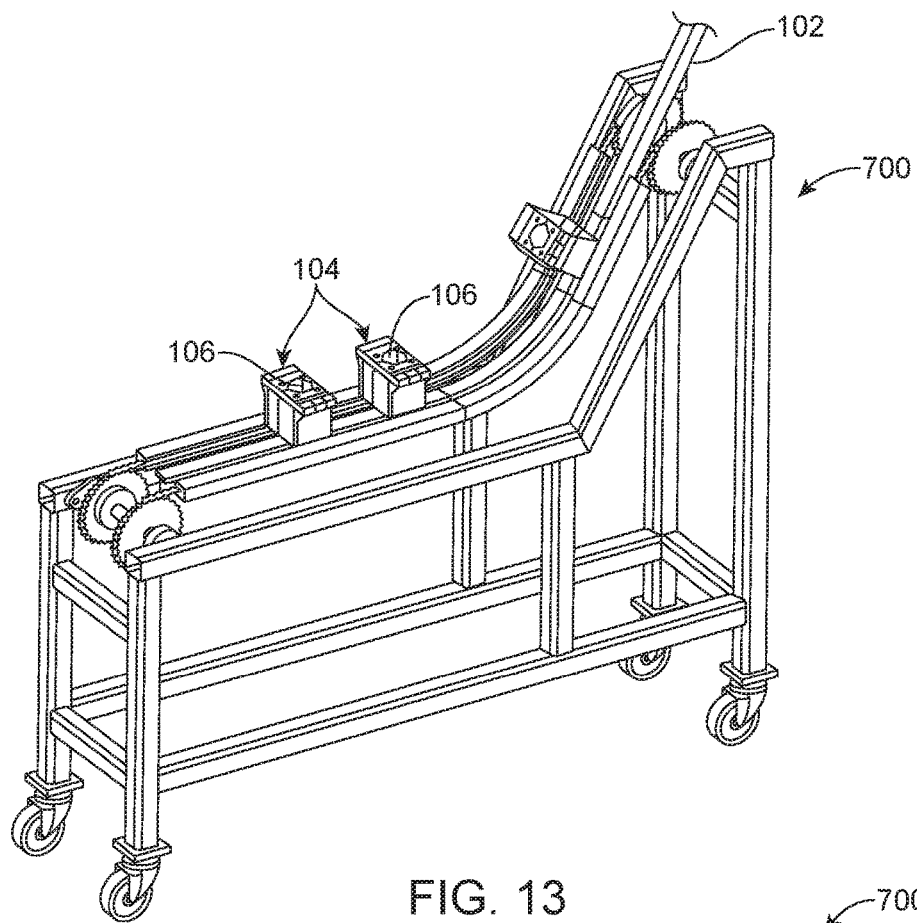
FIG. 13 is an illustrative view of an automated loading and unloading system for mounting/dismounting hydroponic plant growth modules on a vertical growth column.
Figure 14A:
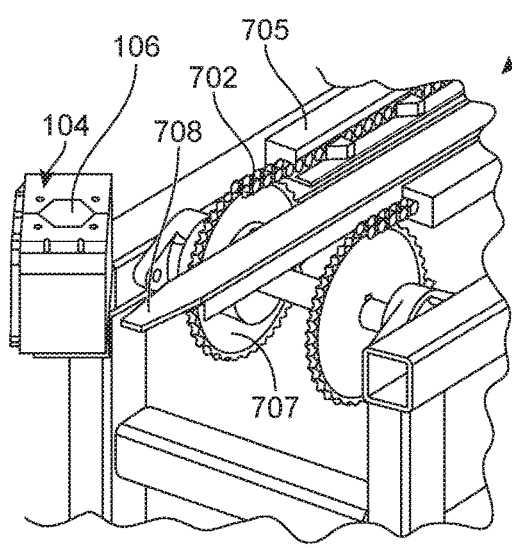
FIG. 14A is an illustrative detail view of a hydroponic plant growth module being loaded onto the automated loading and unloading system.
Figure 14B:
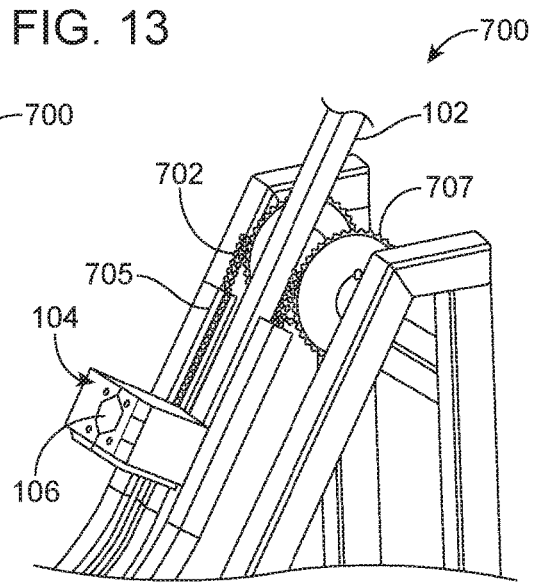
FIG. 14B is an illustrative detail view of a hydroponic plant growth module being guided onto a vertical support growth column from the automated loading and unloading system.
Figure 17:
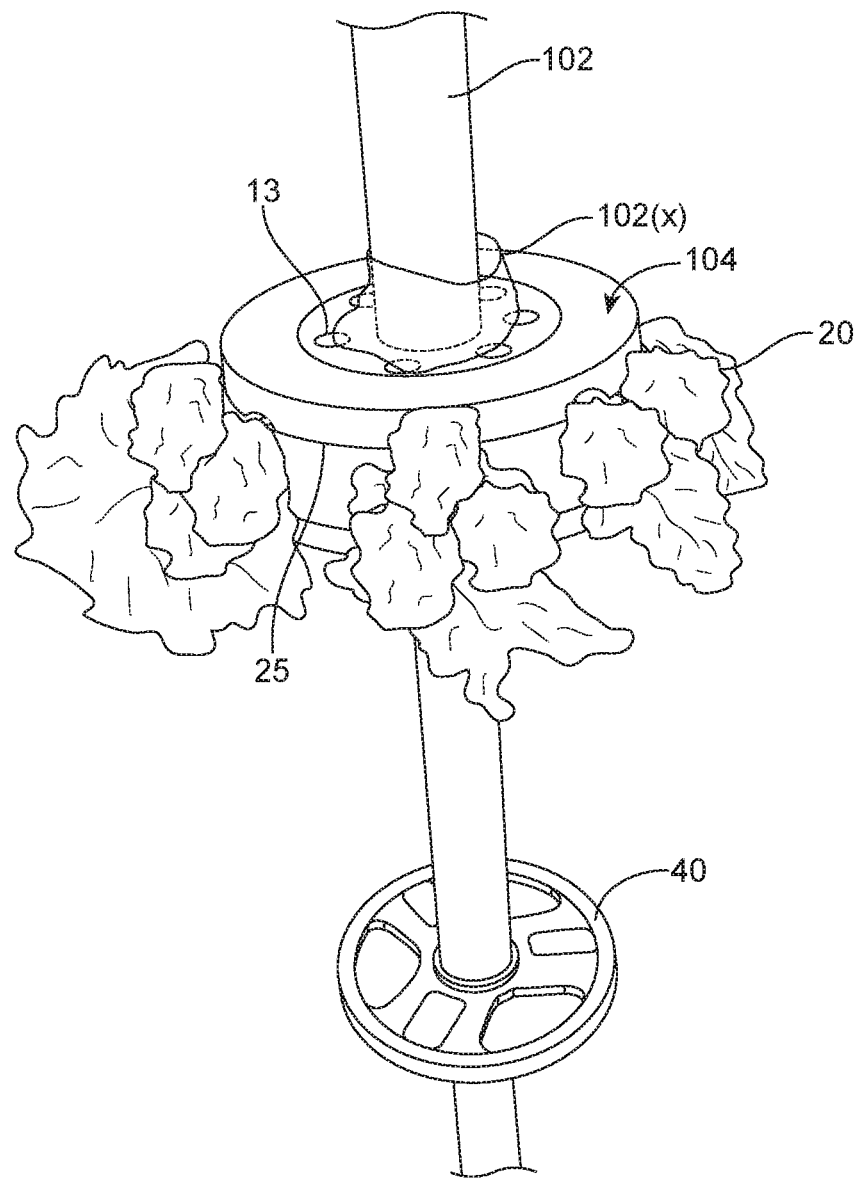
FIG. 17 is an illustrative example of a circular hydroponic plant growth module configuration on a suspended vertical column with a counter-weight to provided added stability.

Still further, in some embodiments the hydroponic plant growth modules 104 and spacer modules 105 are configured with expandable wall height means 25, as illustrated in FIGS. 11A and 17. The expandable hydroponic plant growth modules provide additional means to generate alternate, non-standard module heights to accommodate larger plant crops and achieve an logistically preferable spacing between hydroponic plant growth modules.

Further still, in some embodiments, the hydroponic plant growth modules 104 and spacer modules 105 are configured in alternative shapes and configurations as illustrated in FIGS. 12A through 12C and 17. As illustrated herein, the hydroponic plant growth module 104 is configured in a circular disc shape, having a through hole 102$x$ configured to mate with and secure to the vertical growth column 102. As illustrated herein the vertical growth column 102 is configured in a cylindrical shape, as is the through-hole 102$x$ of the hydroponic plant growth module 104. As noted previously, fixation of alternatively shaped hydroponic plant growth modules to the column at fixed vertical locations can be achieved through alternate means comprising wires, through-holes, bayonette features, suspension cables, notched steps or grooves. However, as one of skill in the art would easily recognize upon reading this disclosure, the shape of the vertical growth column 104 and/or the hydroponic plant growth module through-hole 102$x$ (attachment mechanism) can be any shape, as illustrated by the growth module configuration in FIG. 12C, illustrating a polygonal configuration.

As further illustrated in FIG. 12C, a hydroponic plant growth module 104 can be configured with "sub-modules" 104$s$; comprising a plurality of hydroponic plant sub-module growth modules encased in a larger growth module housing. Each hydroponic plant sub-module 104$s$ can detachably assemble to a primary hydroponic plant growth module 104, functions as a separate hydroponic plant growth module, and includes drain holes 13 and a lateral opening 106. Such a configuration would be ideally suited for smaller plants, seedlings and starter plant growth conditions, allowing for logistically compact growing conditions when spacing is less critical. Starter plants could then be re-seeded into larger hydroponic plant growth modules and placed back into the growth circuit at appropriate times to maintain a continuous growth pattern within the system.

Yet another configuration, as illustrated in FIG. 17, shows a circular hydroponic plant growth module 104, as described above, configured for vertical suspension from an overhead supporting structure 101, 103 and/or conveyance system 200(*a*). In this configuration, a vertical growth column is configured to be free-hanging, and optionally allowed to spin or sway and provided with a counter-weight 40 for added stability. The hydroponic plant growth modules may alternately be configured with or without hydroponic plant sub-modules 104$s$, as described above, as well as separable, expandable side-walls 25.

In some embodiments of the system, the hydroponic plant growth module 104 comprises; a rectangular shape about the sides; a cube shape about its sides; a triangular shape about the sides; a pentagon shape about the sides; a hexagon shape about the sides; a partially circular shape about the sides; a completely circular shape about the sides, a non-flat, irregular shape about the sides; a non-symmetric, irregular shape about its sides; or any combination thereof; wherein one part of a side surface is configured for detachable fixation to the vertical growth columns, and wherein at least one part of a side surface comprises at least one lateral growth opening exposed to the light emitting source. In some embodiments, the hydroponic plant growth module further comprises; an open top surface; a closed top surface; an open bottom surface; a closed bottom surface, a partially open top surface, a partially closed bottom surface and/or at least one drain hole.

Although not illustrated herein, one of skill in the art will also recognize upon reading this disclosure that the hydroponic plant growth modules could be configured for placement in any orientation about the vertical growth column. In other words, the hydroponic plant growth modules 104, regardless of their shape or configuration can be oriented such that the lateral growth opening can face in any direction in a 360 degree circle about the vertical growth column.

Figure 9:
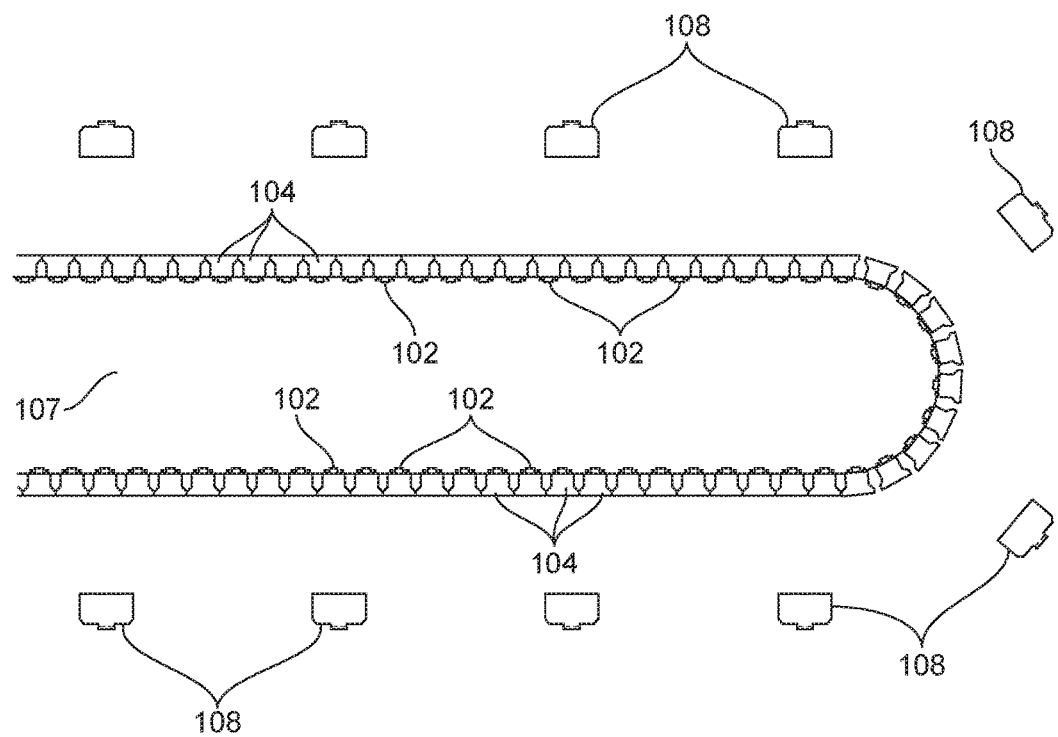
FIG. 9 is an illustrative schematic showing possible lateral lighting system placement around the vertical growth columns relative to a conveyor system.

As illustrated in FIG. 9, in some embodiments, the light emitting source 108 comprises light emitting diodes (LEDs). In some embodiments, the hydroponic plant growth module comprises a plurality of the lateral growth openings 106, wherein the LEDs 108 are appropriately spaced both vertically and radially around the vertical growth system 101 and throughout the growth chamber 100 to provide adequate, adjustable lighting levels to the plant crop 20 in the hydroponic plant growth modules, to encourage lateral growth thereby at least partly suppressing gravitropism in the growing plant.

Figure 19:
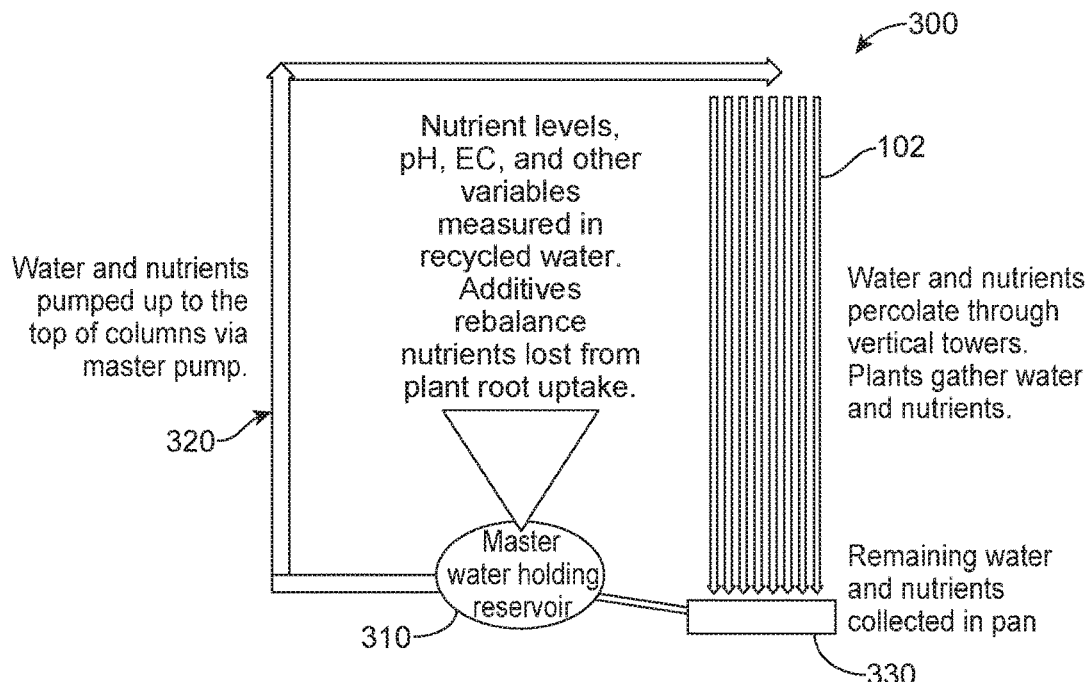
FIG. 19 is an illustrative schematic of a gravity-feed water and nutrient supply system supporting the vertical farming system.

Provided herein is a plant growing system configured for high density crop growth and yield, the system comprising: an environmentally-controlled growing chamber 100; a vertical growth column 102, within the growing chamber, configured to support a hydroponic plant growth module 104; the hydroponic plant growth module configured for: containing and supporting hydroponic plant growth media for containing and supporting a root structure of at least one crop plant growing therein, the at least one crop plant being of a gravitropic plant species; and detachably mounting 109 to the vertical growth column 102, the hydroponic plant growth module comprising: a lateral growth opening 106 configured to allow the at least one growing plant 20 to grow through the growth opening in a lateral direction of growth when the hydroponic plant growth module is mounted to one of the vertical growth columns; and an upper and a lower opening 11, 12, each configured to allow an aqueous crop nutrient solution to flow therethrough; a light emitting source 108 positioned laterally from the lateral growth opening when the hydroponic plant growth module is mounted to the vertical growth column, the light emitting source configured to emit light toward the lateral growth opening in a direction generally opposite to the lateral direction of growth, to thereby at least partly suppress gravitropism in the growing crop plant and to encourage the crop plant to grow from the lateral growth opening in the lateral direction of growth; a nutrient supply system 300, such as the non-limiting system illustrated in FIG. 19 configured to direct the aqueous crop nutrient solution from a reservoir 310, pumped up to the tops of the vertical growth columns via a pump and piping system 320, and distributed through the upper opening of the hydroponic plant growth module when mounted to the vertical growth column; an airflow source 400 configured to, when the hydroponic plant growth module is mounted to the vertical growth column, direct airflow away from the lateral growth opening in the lateral growth direction of growth and through an under-canopy of the growing plant, so as to disturb the boundary layer of the under-canopy of the growing plant; and a control system 600 as illustrated in FIGS. 21A and 21B, comprising: a sensor 615 configured for measuring an environmental growing condition 610 in the environmentally-controlled growing chamber over time to generate environmental condition data 645; a device configured for measuring a crop characteristic 625 of a plant grown in the hydroponic plant growth module in the environmentally-controlled growing chamber to generate crop growth data; and a processing device 635 comprising at least one processor, a memory, an operating system configured to perform executable instructions, and a computer program including instructions executable by the processing device to create an application comprising: a software module 665 configured for receiving the environmental condition data and the crop growth data from the environmental sensor 30, 615 and the measuring device 625; a software module configured to apply an algorithm 655 to the environmental condition data 610 and the crop growth data to generate an improved environmental growing condition; and a software module configured to generate and transmit instructions 671/672/674 for adjustment of the environmental growing condition in or around the hydroponic plant growth module to a sub-system 675/685 of the environmentally-controlled growing chamber to implement the improved environmental growing condition.

In some embodiments, the device is a crop characteristic measuring device 625 or digital image capturing device positioned and configured to capture images of the under-canopy when the hydroponic plant growth module is mounted to the vertical growth columns, and further wherein the crop characteristic is a leaf area index (LAI).

In some embodiments, the plant growing system further comprises a plurality of nutrient concentration sensors 615 adapted to measure, in the aqueous crop nutrient solution, an aqueous concentration of at least one nutrient selected from the group consisting of: zinc; molybdenum; manganese; iron; copper; chlorine; boron; sulfur; magnesium; calcium; potassium; phosphorus; and nitrogen.

In some embodiments, the sub-system is selected from the group consisting of: a lighting control sub-system (not shown); a HVAC control sub-system (not shown); a nutrient supply control sub-system 300; a conveyance control sub-system (not shown); and a vertical lift mechanism control sub-system 700.

In some embodiments, the computer program including instructions executable by the processing device comprises artificial intelligence programming capable of generating an improved environmental growing condition 610 based at least in part on continuously updated environmental and crop growth data 695.

In some embodiments, as illustrated in FIG. 20, the computer control system or master control system 600, comprises: an input variable server 620, a Fog Node 630, a SCADA interface 640 to provide instantaneous automatic control 650, Cloud Servers 660, Graphical Displays 670, the ability to accommodate and provide Real Time Queries 680 and software systems providing Deep Learning, Artificial Intelligence programming 690. When properly programmed and combined the master control system 600 monitors growth conditions 610 of the enclosed production farming facility 1000, 1001, the growth chambers 100 and individual hydroponic plant growth modules 104 in each vertical growth system 101, analyzing the input data from the monitored growth conditions 610 provided by the sensors 615 and crop characteristic measuring devices 625, sent to the sensor arrays 30 and subsequently transmitted to the master control system 600 for processing. Once this data is collected and analyzed, the master control system 600 is configured, through Deep Learning, Artificial Intelligence programming 690, to adjust growth conditions by sending out new instructions 671, 672, 674 to the various environmental control systems 675, 685 and nutrient control systems 300 in order to improve and continually optimize the output characteristics 695 of the crop.

In some embodiments of the plant growing systems the output characteristics 695 of the crop comprise nutrition levels, weight, growth (manufacturing/production) costs, color or appearance, flavor and/or texture.

In some embodiments of the plant growing systems above, the plant species 20 is a leafy green.

In some embodiments of the plant growing systems above, the plant species 20 is an edible plant species selected from the group consisting of: Apiaceae; Asteraceae; Lauraceae; palms; herbs; Sapindaceae; and Solanaceae.

In some embodiments of the plant growing systems above, the airflow source 400 is configured to generate sufficient airflow so as to disrupt growth of bacteria or fungi.

In some embodiments of the plant growing systems above, the vertical growth column 102 is configured to be free-standing.

In some embodiments of the plant growing systems above, the vertical growth column 102 is configured to be rotatable about a central axis.

In some embodiments of the plant growing systems above, the vertical growth column 102 is configured with a guided vertical lift mechanism 700, incorporated into the vertical growth column, capable of individually supporting, individually spacing, lifting and lowering the hydroponic plant growth module 104 mounted to the vertical growth column.

In some embodiments of the plant growing systems above, the plant growing system further comprises a loading/unloading system 700 to control position, movement and placement of the hydroponic plant growth module 104 along the height vertical growth column 102.

As illustrated in the non-limiting illustrative FIGS. 13, 14A, 14B, 15 and 16, a loading/unloading system 700 is utilized as one means to space and load modules onto and/or off of a vertical growth column. Such a system is configurable as a mobile system capable of being placed anywhere along a conveyance circuit, with particularly useful application in the seed and harvesting staging areas. Additionally, one of skill in the art would now recognize based on this disclosure that the loading/unloading system 700 could further be utilized to adjust spacing of modules at any point along the conveyance circuit, during any stage of growth, to provide additional spacing between modules for added under-canopy spacing between plants.

The non-limiting illustrative loading/unloading system 700, as depicted herein, comprises a means for connecting to the growth columns 102 via a guide rail that guides the attachment of the hydroponic plant growth module 104 attachment feature 109 to the vertical growth column as the hydroponic plant growth module is moved along on the loading/unloading system 700 by means of a drive system. The non-limiting illustrative drive system, as shown comprises a drive chain 702, a guided chain mechanism 705, the chain sprocket gear 707, the guide rail 708, and a lug drive mechanism 710, configured such that the hydroponic plant growth modules 104 can be placed on the guide rail 708, with the lateral opening 106 facing up or out, depending on the initial starting orientation for the loading or unloading operation, then driven onto or off of the vertical growth column in a secure manner.

Further still, as illustrated in the non-limiting FIGS. 22A and 22B, the vertical growth column 102 can alternately be configured as a "sleeve" (102) comprising a guided vertical lift track 500, or similar track feature, configured to work in concert with the loading/unloading system 700, wherein the hydroponic plant growth modules are loaded into the sleeve 102 and spaced along the internal track 500 to control spacing between modules. In this configuration, the column/sleeve can be loaded or unloaded from either the top or the bottom in a controlled and/or automated manner with or without the loading/unloading system 700 described above.

Provided herein is a multi-stage plant growing system configured for high density growth and crop yield, the system comprising: an environmentally-controlled growing chamber; a plurality of vertical growth columns, disposed within the growing chamber, each configured to support at least one hydroponic plant growth module; a plurality of said hydroponic plant growth modules, each configured for mounting to at least one of the vertical growth columns, each hydroponic plant growth module comprising at least one lateral growth opening; a nutrient supply system configured to provide water and nutrients to the hydroponic plant growth modules; a light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source.

Provided herein is a multi-stage plant growing system configured for high density growth and crop yield, the system comprising: an enclosed, environmentally-controlled growing chamber; a plurality of vertical growth columns, disposed within the growing chamber, each configured to support at least one hydroponic plant growth module; a structure for supporting 101, 103 the plurality of vertical growth columns; a plurality of said hydroponic plant growth modules, each configured for mounting to at least one of the vertical growth columns, each hydroponic plant growth module comprising at least one lateral growth opening; a gravity-feed nutrient supply system configured to provide water and nutrients to the hydroponic plant growth modules; a laterally-positioned light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, wherein the vertical columns are positioned about the supporting structure 101, 103 so as to provide optimal spacing for high density growth from a crop of plants growing out of the at least one lateral opening in each hydroponic plant growth module, and wherein the crop of plants are continually staged in their planting cycles about the columns so as to provide a continuous annual yield.

Provided herein is a multi-stage plant growing system configured for high density growth and crop yield, the system comprising: an enclosed, environmentally-controlled growing chamber; a plurality of vertical growth columns, disposed within the growing chamber, configured to support at least one hydroponic plant growth module; a structure for supporting the plurality of vertical growth columns; a conveyance system 200(*a*)/200(*b*) for moving the plurality of vertical growth columns about the perimeter of the supporting structure 101, 103 in a conveyance circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; a laterally-positioned light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, wherein the vertical columns are positioned about the supporting structure 101, 103 so as to provide optimal spacing for high density growth from a crop of plants growing out of the at least one lateral opening in at least one hydroponic plant growth module, wherein the delivery mechanism of the gravity-feed nutrient supply system is positioned at the top of the vertical growth column and configured to supply said water and nutrients, and in some cases airflow to at least the top hydroponic plant growth module mounted on the vertical column; wherein each of the plurality of said hydroponic plant growth modules are configured with at least one drain 13 to allow the water and nutrients to flow vertically down to the plurality of hydroponic plant growth modules positioned below; wherein the crop of plants are continuously staged in their planting cycles about the columns so as to provide a continuous annual yield; and wherein the conveyance system 200(*a*)/200(*b*) is utilized to move the columns about the conveyance circuit to a staging area for loading and harvesting the crop from the hydroponic plant growth modules.

As illustrated in FIGS. 5, 6, 7A, 7B, 7C and 7D, in some embodiments, a conveyance system 200(*a*)/200(*b*) is utilized to move the vertical growth columns 102 comprising the hydroponic plant growth modules 104 about the conveyance circuit. The conveyance system can be a vertically driven 200(*a*), a bottom driven conveyance system 200(*b*), or combination of both 200(*a*)/200(*b*). As shown in the non-limiting illustrations herein, the top-mounted conveyance components 200(*a*) comprise rollers 202, guiderails 203 mounted to the support structure 103, and vertical column hangers 204 for mounting directly to the vertical column 102. The hangers 204 are configurable to allow the vertical columns 104 to hang freely, if unsupported at the bottom, or to spin, if desired, as noted above. The bottom-mounted conveyance components 200(*b*) are configurable as guide components to stabilize the hanging growth columns, if desired, or simply to assist with guiding the hanging growth columns around the conveyance circuit while maintaining spacing between the columns, as illustrated in FIG. 8C. Alternatively the bottom-mounted conveyance components 200(*b*) are configurable to act as drive components for the conveyance system as illustrated in FIG. 8B, reversing the roles described for the conveyance system described previously. Further still, the conveyance system can be configured to work as a complimentary combination system 200(*a*)/200(*b*) wherein the top-mounted and bottom-mounted conveyance components work in tandem to move the vertical growth columns around the conveyance circuit.

Provided herein is a multi-stage plant growing system configured for high density growth and crop yield, the system comprising: an enclosed, environmentally-controlled growing chamber; a plurality of vertical growth columns, disposed within the growing chamber, configured to support at least one hydroponic plant growth module; a structure for supporting the plurality of vertical growth columns; a conveyance system for moving the plurality of vertical growth columns about the perimeter of the supporting structure in a circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the plant hydroponic growth modules with a delivery mechanism 206 (guide bucket) affixed to the vertical columns; a laterally-positioned light emitting source 108 configured to encourage lateral plant growth from the at least one lateral growth opening in at least one hydroponic plant growth module; an airflow source 400 configured to direct airflow to disturb the boundary layer of at least one plant under-canopy of a plant growing in one of the hydroponic plant growth modules; and an environment control system 600 for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source, a master control system capable of machine learning configured for regulating the environment control system and movement of the conveyance system 200(*a*)/200(*b*) in order to provide optimal control of the crop density and yield throughout each crop growth cycle; wherein the vertical columns are positioned about the supporting structure so as to provide optimal spacing for high density growth from a crop of plants growing out of the at least one lateral opening in at least one hydroponic plant growth module, wherein the delivery mechanism of the gravity-feed nutrient supply system is positioned at the top of the vertical growth column and configured to supply said water and nutrients to at least the top hydroponic plant growth module mounted on the vertical column; wherein each of the plurality of said hydroponic plant growth modules are configured with at least one drain 13 to allow the water and nutrients to flow vertically down to the plurality of hydroponic plant growth modules positioned below; wherein the crop of plants are continuously staged in their planting cycles about the columns so as to provide a continuous annual yield; and wherein the conveyance system is utilized to move the columns about the circuit to a staging area for loading and harvesting the crop from the hydroponic plant growth modules.

Provided herein is a multi-stage plant growing system configured for high density growth and crop yield, the system comprising: an environmentally-controlled growing chamber; a plurality of vertical growth columns, disposed within the growing chamber, each vertical growth column configured from a plurality of hydroponic plant growth modules; wherein the plurality of said hydroponic plant growth modules are each configured for mounting to another hydroponic plant growth module above and below itself in order to form said vertical growth column, each hydroponic plant growth module comprising at least one lateral growth opening; a structure for supporting the plurality of vertical growth columns; a nutrient supply system configured to provide water and nutrients to the hydroponic plant growth modules; a light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a control system for regulating at least one growing condition in the environmentally-controlled growing chamber, the growing condition comprising; a temperature, a humidity, a gas content, airflow, a flow of the water, a flow of the nutrients, a quality of light emission from the light source, and a quantity of light emission from the light source.

In any one of the preceding multi-stage plant growing system embodiments, the system further comprises a plenum to receive and direct air from the airflow source, wherein the airflow source is a forced airflow, and wherein the plenum further comprises a plurality of ducts configured to divide and distribute said forced airflow, with fans and or blowers, to disturb the boundary layer of at least one plant under-canopy of a plant growing in one of the hydroponic plant growth modules.

In any one of the preceding multi-stage plant growing system embodiments, the airflow may be generated by any means of turbulence such that air if forced to move to disturb the boundary layer of said plant or plants in the vertical growth system. The turbulence may be generated from above, below or laterally to the plant or plants in the column such that the air is forced to move to disturb the boundary layer and reduce or remove excess heat and/or humidity from the boundary layer and/or roots.

As illustrated in FIGS. 1A and 1B, the inventors have conceived a system for automating and integrating the traditional agricultural farm and greenhouse farming under one roof 1000, 1001 by incorporating one or more massive environmentally-controlled growing chambers 100; a plurality of vertical growth columns 101, 102 dispersed within each of the growing chambers, unique hydroponic plant growth modules 104 with lateral growth openings 106 to optimize crop yields per square foot by minimizing vertical crowding of plants between hydroponic plant growth modules, and an environment control system 600 for regulating at least one growing condition in the environmentally-controlled growing chamber 100. Additionally, the inclusion of automated conveyance systems 200(a)/200(b), and sensors 615 tied to special machine learning software 655 configured to adaptively optimize the growing conditions 610 within the growth chambers in response to any number of identified characteristics 695 monitored by the sensors has been shown to dramatically increase the annual crop yield by shortening the growth cycle of crops and expediting the delivery of fresh produce from the vertical farm facility to local markets. An exemplary characteristic of plant growth is leaf area index, which may be calculated by crop characteristic measuring devices 625 such as image equipment including cameras and accompanying software. By combining these factors with an automated planting and harvesting apparatus capable of re-planting new crops and fresh-packing the harvested crop for immediate bulk delivery by local transport, the inventors have increased production and output up to at least 33 growth cycles per year.

Figure 3:
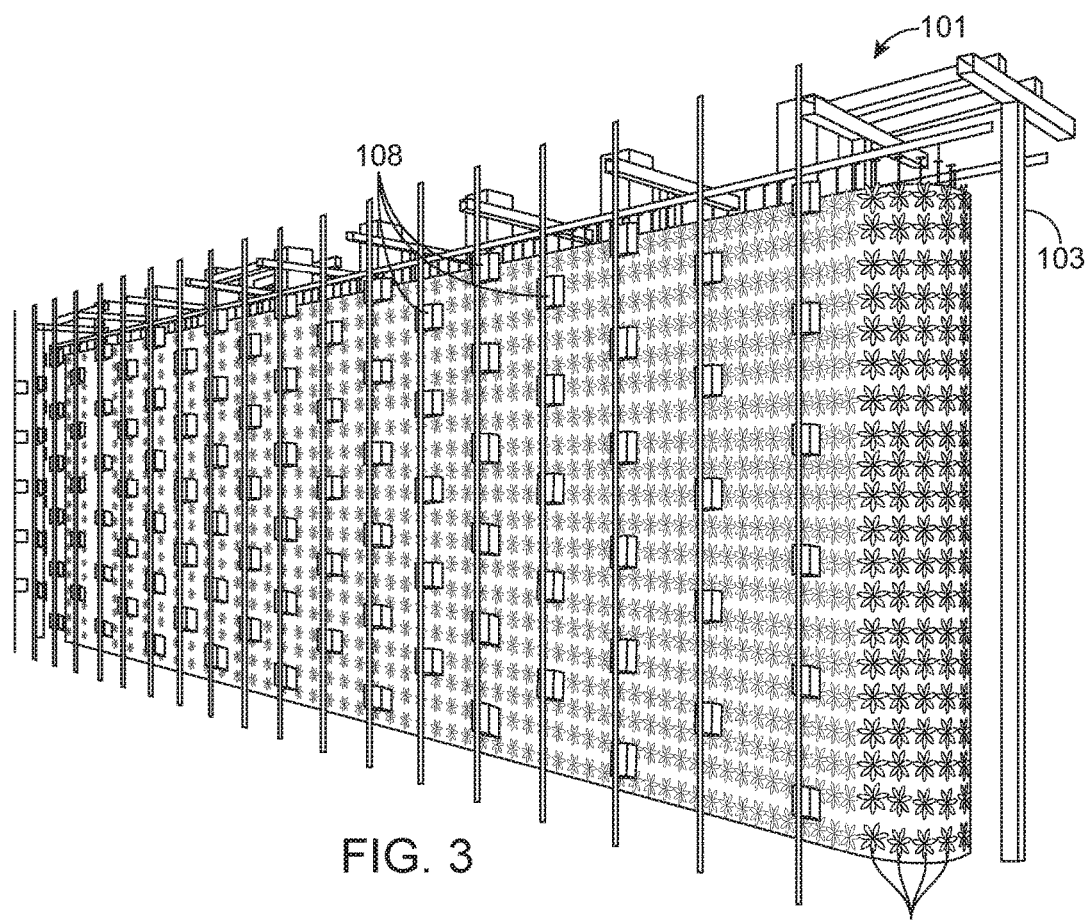
FIG. 3 is another illustrative isometric view of one multi-stage vertical growth system.

As further illustrated in FIG. 3, an environmentally-controlled growing chamber 100 is extremely large and is limited in geographic size and volume only by the ability to economically provide environmental systems (i.e.: heating, ventilation, air conditioning, (HVAC)) capable of accurately controlling the internal environment of the chamber. Those conditions would include: temperature, humidity, gas content of the air in the chamber (i.e.: $CO_2$, $N_2$, $O_2$, etc.), airflow, lighting quality and quantity.

Further, each chamber can hold multiple vertical growth structures, each structure containing multiple (i.e.: up to hundreds, or more), vertical growth columns, each of which is capable of supporting multiple (i.e.: up to tens, or more), hydroponic plant growth modules. Alternatively, a vertical growth structure can contain as few as three vertical growth columns.

Additionally, as was illustrated in FIG. 1A, natural external light is utilized to further augment this system, by either providing an additional (direct) light source through the roof of the environmentally-controlled growing chamber, or by employing solar energy harvested from solar panels mounted on the roof or from a nearby solar farm to power lighting, power back-up systems or environmental control systems.

Referring now to FIGS. 3, 10A, 10B and 18 the vertical columns comprise multiple possible configurations that include: rectangular or other flat-sided shaped support columns having vertical loading point locations on one side (facing outward) for hydroponic plant growth modules that are adapted to be fixed at specific vertical locations, each hydroponic plant growth module having at least one lateral growth opening for a plant to grow out of laterally toward the light source; rectangular or other flat-sided shaped support columns having multiple vertical loading point locations on multiple sides (all sides of the column) for hydroponic plant growth modules that are adapted to be fixed at specific, potentially staggered vertical and radial locations; circular or other non-flat-sided support columns configured with multiple vertical loading point locations all around the non-flat circumference (all-around the column) for hydroponic plant growth modules that are adapted to be fixed at specific, potentially radially and vertically staggered vertical locations.

In any one of these configurations, the vertical support column is further configured to be attached to a conveyance system timely translates the columns in the system, to move crops therein from a starting point (i.e.: planting location) to a finishing point (i.e.: harvesting location) along a circuit within the environmentally-controlled growing chamber. Further still, in some embodiments, the conveyance system is further configured to individually rotate each vertical column about its vertical axis, exposing all plants, in all hydroponic plant growth modules mounted on all sides of a column, to equal lighting and airflow.

Further still, in some embodiments, each vertical support column comprises a guided vertical lift mechanism, built into the vertical support column, which is capable of individually supporting, spacing, lifting and lowering each of the hydroponic plant growth modules mounted on a column. This is a particularly useful feature during the planting and harvesting phases and in the event that a vertical spacing adjustment between hydroponic plant growth modules is required to provide extra room for broad plant growth with some plant species that may require additional vertical height between modules prior to harvest.

Still further, a vertical column can be free-standing and self-supporting within the larger structure. In at least one embodiment, the hydroponic plant growth modules are configured to interlock vertically with each other (from above and below), to form a free-standing growth column. In this configuration, each free-standing growth column is also capable of being laterally and rotationally translated by the conveyance system.

Further still, each chamber contains controlled lighting systems 108, as illustrated in FIGS. 2-6 and 9, configured to optimize the growth cycle of the crop. Lighting is optimally placed along the outer perimeter of the vertical column structure, as shown. However, as noted previously, it would be advantageous to have light placement within the vertical column structure is advantageous when hydroponic plant growth modules are placed on more than one side of a vertical growth column.

Figure 4:
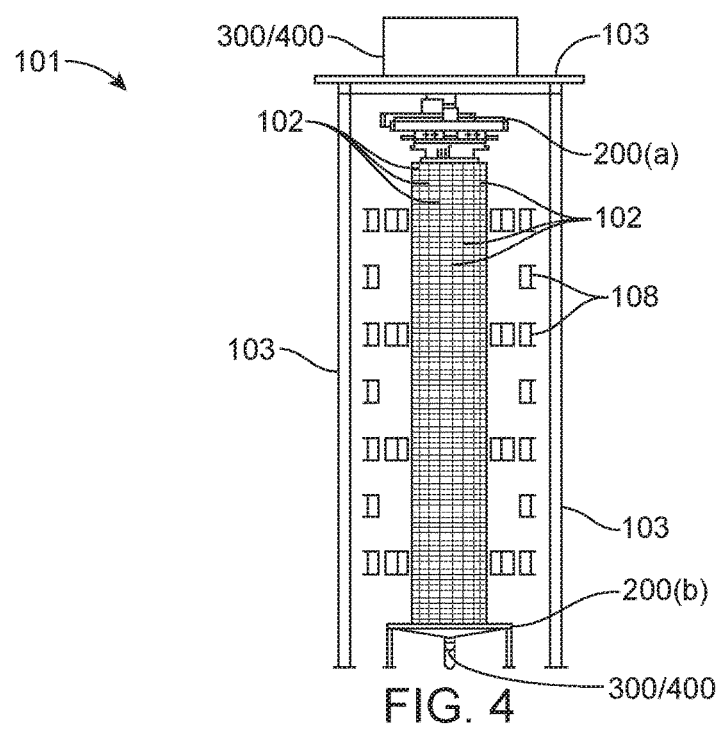
FIG. 4 is an illustrative detail end view one multi-stage vertical growth system showing relative sizing and positions of possible structural supports, lighting and system return-air, gravity-feed water and nutritional supply ducting structures.
Figure 5:
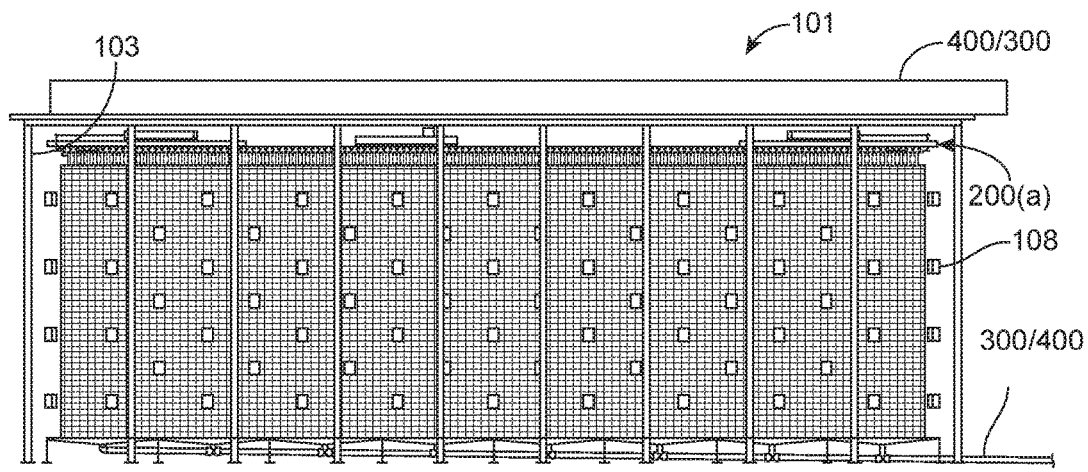
FIG. 5 is an illustrative detail side view one multi-stage vertical growth system showing relative positions of possible structural supports, lighting and system return-air, gravity-feed water and nutritional supply ducting structures.
Figure 6:
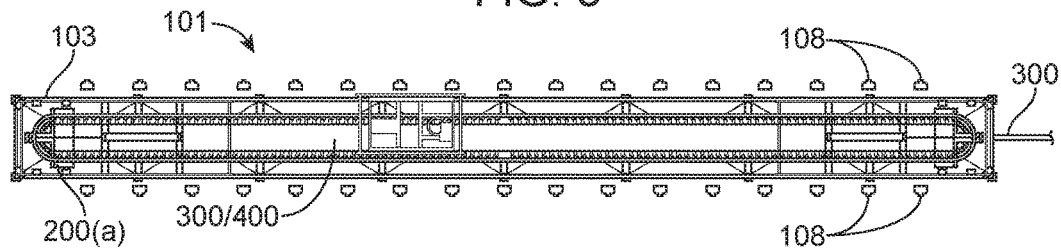
FIG. 6 is an illustrative top view of FIG. 5.

As seen in FIGS. 4-6, strategically located ducting and or piping above and below the vertical column structure provides both a forced air, water and a nutrient supply system specifically configured and controlled to provide optimum airflow, hydration and nourishment to the crop to yield produce with maximal nutritional content, flavor and visual appeal.

Figure 7A:
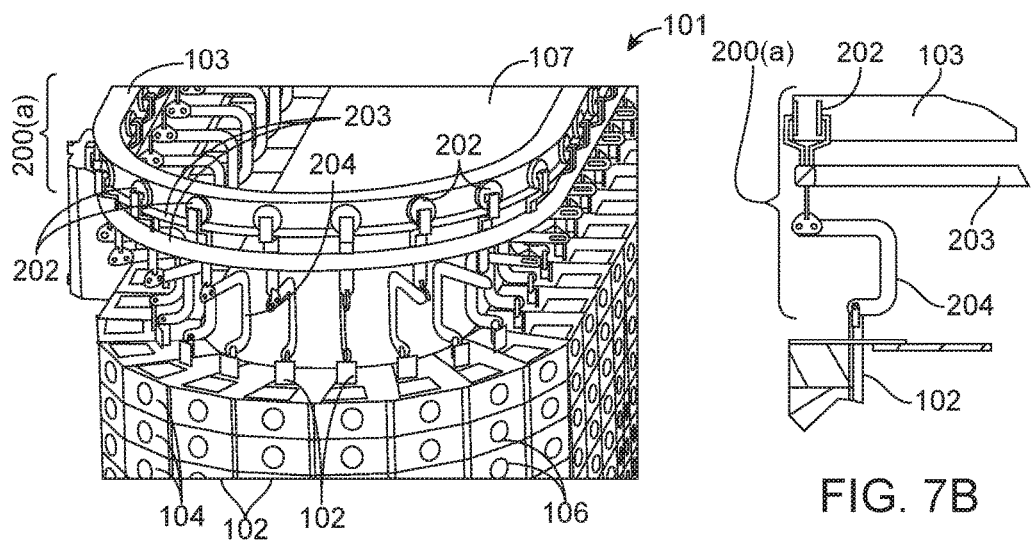
FIG. 7A is an illustrative isometric end view of an (optional) superiorly mounted conveyor system capable of moving the vertical growth columns about a structural support circuit and an upper air baffle.
Figure 7B:
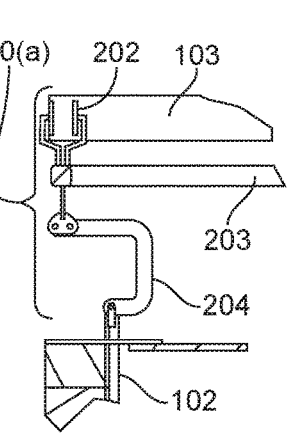
FIG. 7B is an illustrative side cross-section view of an (optional) superiorly mounted conveyor system capable of moving the vertical growth columns about a structural support circuit and an upper air baffle.
Figure 8C:
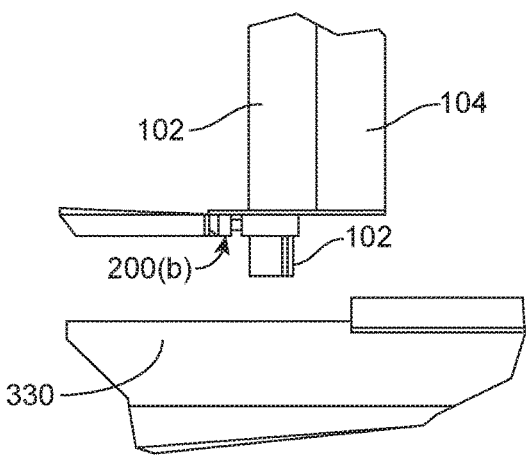
FIG. 8C is an alternative side cross-section view of the inferiorly mounted (optional) conveyor track system, lower air-supply plenum lid, lower air seal, drip pan and T-baffle.

Additionally, an automated conveyance system, such as that illustrated in FIGS. 7A through 8 is provided to optimally move the vertical columns and the crops they support around a timed or fixed circuit designed to match that crop's optimal growth cycle from its planting stage to its harvest stage. Additionally, as noted previously, in some embodiments, the conveyance system is further automated to rotate the columns about their vertical axis, to expose the vertical growth columns with multiple-sided hydroponic plant growth module configurations to equal amounts of lighting and airflow. In some embodiments, the conveyance system is an overhead suspension drive system, such as a ski-lift or dry-cleaning conveyor. In some embodiments, the conveyance system is a ground level conveyor system, such as a belt conveyor. In some embodiments, the conveyance system is a combination overhead suspension conveyance system with a rotating drive mechanism attached to the top of each vertical growth column. In some embodiments, the conveyance system is a combination ground level conveyance system with rotating platforms under each vertical growth column. In some embodiments, the conveyance system has combinations and variations of each of the systems described above.

Even further, biologic, bacterial, fungal and pest infestation can be additionally controlled through a (forced) airflow system in the chamber. In a preferred embodiment, the airflow system would provide conditioned airflow, directed upward, from within the vertical structure created by the vertical growth columns, blowing forced air, preferably through a plenum, as illustrated in FIGS. 4, 5 and 7C, comprising ducts that are strategically configured to optimally direct the airflow past the growing plants in the columns. In some embodiments, airflow is directed toward the underside of a plant's canopy and/or through its boundary layer, to disturb the boundary layer and release heat and/or humidity from the boundary layer. It is known that improving airflow in, around, and/or through the underside of a plant's canopy or boundary layer is associated with a reduction in biologic, bacterial, fungal and pest infestations. By improving the airflow in, around, and/or through growing plant canopies, and in particular to disturb the boundary layer, the present invention addresses these costly problems incurred in conventional in-field and indoor agriculture.

Temperature control is physically and economically optimized in the chamber by driving airflow upward and outward, whereas air heated by the lighting apparatus (and from natural solar heating) in the chamber naturally rises within the chamber.

Growth Modules, having a wide variety of possible configurations, as illustrated in FIGS. 10A through 12C and 17, are a key component of the multi-stage plant growing system. The hydroponic plant growth modules are specifically designed to encourage plant growth laterally out of the hydroponic plant growth module towards the laterally positioned light sources, as illustrated in one preferred embodiment. Each hydroponic plant growth module contains at least one lateral growth opening facing away from the vertical support growth column (opposite the attachment feature of the hydroponic plant growth module). In those embodiments where the vertical growth column is a free-standing structure, each hydroponic plant growth module contains only one lateral growth opening, but the hydroponic plant growth modules are capable of being stacked with all lateral growth openings facing either the same direction or stacked radially in different orientations. Further still, in some embodiments of the system, the hydroponic plant growth module comprises a live hinge for detachable fixation to the vertical growth columns. In some embodiments, the hydroponic plant growth module comprises a fixed lip or hinge arrangement for detachable fixation to the vertical growth columns, as illustrated in FIGS. 11A and 11B. In some embodiments of the system, the hydroponic plant growth module comprises a (separable) ring for detachable fixation to the vertical growth columns, as illustrated in FIGS. 12A-12C and 17.

Light sources 108 for use in the system comprise halogen, incandescent, or fluorescent light sources or light emitting diodes (LEDs) which provide a cost effective manner of providing light to plants to encourage photosynthesis. In some embodiments, emitted light is filtered or adapted to emit a specific wavelength range to the growing plants to, for example, encourage plant growth rate, flavor profile, or some other characteristic, which may be specific to a given crop or varietal. An exemplary characteristic is leaf area index, which may be measured with the implementation of image capture techniques including cameras and accompanying software. The wavelengths may also be adjusted or adapted to control pest, bacterial, or fungal growth on plants or otherwise within the system. In some embodiments, the lighting provided to the plants may be augmented by natural solar light allowed to enter the chamber.

Lighting may be provided to the plants on a continual basis throughout an entire growth cycle. In some embodiments, the length of light/dark cycles may be adapted for a given crop or varietal. The length of these light/dark cycles may be adjusted or adapted, for example to encourage plant growth rate, flavor profile, or some other characteristic, which may be specific to a given crop or varietal. An exemplary characteristic is leaf area index, as discussed in the preceding paragraph.

In some embodiments, the lighting source is positioned generally laterally to the hydroponic plant growth modules and the lateral opening of the hydroponic plant growth module so as to promote plant growth that is generally parallel to the ground. In some embodiments, the lighting source is positioned generally laterally to the hydroponic plant growth modules and the lateral opening of the hydroponic plant growth module so as to promote plant growth that is generally horizontal relative to the ground. In some embodiments, the lighting source is positioned generally laterally to the hydroponic plant growth modules and the lateral opening of the growth module so as to promote plant growth that is generally perpendicular to the side of the hydroponic plant growth module. In any one of the embodiments just described, the phrases "generally parallel to the ground", "generally horizontal relative to the ground", "generally perpendicular to the side of the hydroponic plant growth module", refers to a growth pattern that is general straight out of the lateral growth opening and moving toward the light source, however, due to spacing arrangements between the light source and the lateral growth opening of the hydroponic plant growth module, these phrases are also intended to mean and include modestly angled (i.e.: about 0.1 degrees-15.0 degrees, 0.1 degrees-20 degrees, 0.1 degrees-25 degrees, 0.1 degrees-30 degrees, 0.1 degrees-35 degrees, 0.1 degrees-40 degrees, 0.1 degrees-45 degrees, 0.1 degrees-50 degrees) plant growth that is in any radial direction away from exactly parallel to the ground.

As further illustrated in FIGS. 10A, 10B, 11A, 11B and 12A-12C, in some embodiments of the system, the at least one hydroponic plant growth module comprises; a rectangular shape about the sides; a cube shape about its sides; a triangular shape about the sides; a pentagon shape about the sides; a hexagon shape about the sides; a partially circular shape about the sides; a completely circular shape about the sides, a non-flat, irregular shape about the sides; a non-symmetric, irregular shape about its sides; or any combination thereof; wherein one part of a side surface is optionally configured for detachable fixation to a vertical growth column, and wherein at least one part of a side surface comprises at least one lateral growth opening exposed to a light emitting source. Further still, the hydroponic plant growth module is optionally configured to be attached through a middle portion of the shaped hydroponic plant growth module, as illustrated in FIGS. 12A-12C and 17, wherein the hydroponic plant growth module is fixed to the vertical growth column by an number of means, including such things as wires, bayonette features, suspension cables, notched steps or grooves in the hydroponic plant growth module, notched steps or grooves in the column, detachably releasable retaining rings or collars placed about the columns and under each hydroponic plant growth module and simple spacers placed between each hydroponic plant growth module to separate the hydroponic plant growth modules along the length of the vertical column.

Referring now to FIGS. 13-16, the system is further configured with a loading/unloading system for mounting or dismounting the hydroponic plant growth modules to a vertical growth column. The loading/unloading system is ideally configured to capture the hinge/attachment feature of the hydroponic plant growth module and guide it onto of off of a vertical growth column support structure. In this position, the lateral growth opening is protected from potential conveyance damage, but readily available and accessible for planting a new plant or harvesting a mature plant. The loading/unloading system is ideally configured as an automated system, but is equally effective as a manually operated system.

Figure 15:
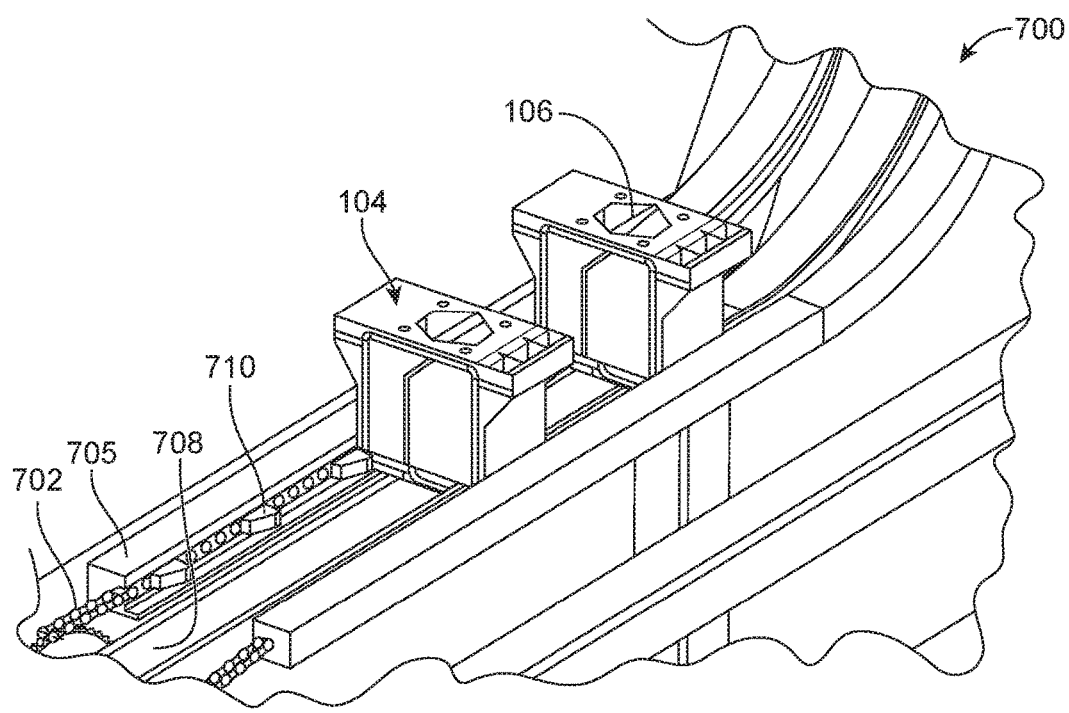
FIG. 15 is an illustrative detail view of one representation of a guided drive mechanism used to support and push the hydroponic plant growth modules up and down the automated loading and unloading system when being loaded or removed from the vertical column.
Figure 16:
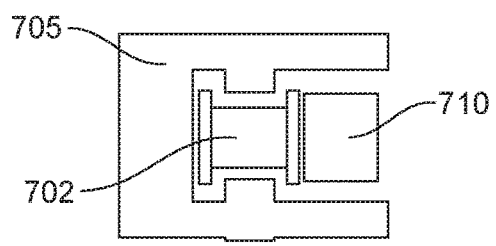
FIG. 16 is an illustrative detail cross-section view of the representative guided drive mechanism of FIG. 15.

As further illustrated in FIGS. 15 and 16, the loading/unloading system is optionally configured with a guided chain and lug driving mechanism to control position, movement and placement of the hydroponic plant growth modules along the loading/unloading system rack and or the vertical support column. On of skill in the art will recognize the utility of using any one of a variety of drive and capture mechanisms including chains, pulleys, belts, latches, etc. to achieve the positioning, movement and placement of the hydroponic plant growth modules, as described herein. As mentioned previously, the vertical support column is also optionally configured with a guided vertical lift mechanism configured to operate synchronously with the loading/unloading system rack.

Referring now to FIG. 17, yet another configuration of a vertical growth column assembly is illustrated, wherein the hydroponic plant growth module comprises at least one circular configuration, centered about the vertical growth column. In this configuration, the hydroponic plant growth module is optionally configured with multiple lateral growth openings. Further still the vertical column is optionally configured to provide forced airflow, gravity-feed water and nutritional ducting structures within the vertical column with ports to and from the circular hydroponic plant growth module.

Further still, the vertical growth column is optionally configured so that the column can rotate about its vertical axis wherein the optionally multiple lateral growth openings are equally exposed to a light source and airflow.

Referring now to FIG. 18, the schematic diagram illustrates the concept of a vertical growth column having multiple hydroponic plant growth modules and a plurality of spacers, and or sensor modules optionally placed between each hydroponic plant growth module, allowing for a multitude of spacing options to account for plant size during variable plant growth cycles, lighting and airflow requirements for a given crop, vertical growth column height, total weight limitations of a system, and sequences for loading and unloading hydroponic plant growth modules. The flexibility provided with this arrangement provides for the potential of high volume manufacturing in an agricultural system. Similar to the benefits of automation, a modular design of this nature is able to send many hydroponic plant growth modules through a high volume, factory line type of system (i.e.: a bottling facility, for example) for seeding, loading, growing, unloading, harvesting, washing, and packing in an automated fashion.

As a further example, if one considered potential output volumes of such a system the benefits of such an arrangement become readily apparent. For example; Consider when 4"-6" tall hydroponic plant growth modules are spaced apart at 6" intervals, (consistent with the lateral spacing of conventional agriculture), each with only one plant per hydroponic plant growth module when fully grown. Then consider vertical growth columns or towers that are 20' in height: This would allow for a minimum of 40 plants in a given cubic foot of space.

Still further, consider the potential of spacing the hydroponic plant growth modules closer to together in early stages of growth, and then creating more space on a column by inserting spacers 105 between the hydroponic plant growth modules as the plants grow and require more space between each plant in order to receive additional light and airflow. Further still, consider the use of hydroponic plant growth modules with vertically expanding side walls 25 to provide the option of creating more vertical space between hydroponic plant growth modules simply be expanding the height of each or selected hydroponic plant growth modules. Alternatively the plants can be removed (either from the top or the bottom) from one vertical growth column or tower and transferred to another vertical growth column or tower to provide additional spacing as needed on any given tower during specific growth periods, or for staging purposes, prior to harvesting through the means of the automated control system and the loading/unloading systems described previously.

Further still, the spacers 105 described herein are also optionally fitted with sensors 615 or sensor arrays 30 configured to monitor critical environmental conditions such as: nutrient levels, water pH, electrical conductivity (EC), and other variables measureable in recycled water percolating through the growth column and growth cubes, in addition to various gas level concentrations such as $O_2$, $CO_2$, $O_2$ dissolved in water, and water temperature, air temperature, environmental ambient air speed, light spectrum, air pressure and humidity.

Referring now to FIG. 19, the illustrative schematic of a gravity-feed water and nutrient supply system 300 supporting the vertical farming system provides an example of one means for providing automated hydration and nutritional support to the system. As illustrated herein, a master water reservoir 310 is optionally utilized for initial seeding of key nutrient levels and rebalancing of key nutrient levels in recycled water retrieved the vertical farming system collection system. Prepared water and nutrients would then be pumped 320 up to the top of the vertical growth columns or towers and distributed to each of the vertical growth columns 102 in a controlled flow, allowing the water and nutrients to percolate through the hydroponic plant growth modules located on each vertical growth column. Optionally, additional distribution points at lower points along the vertical column may also be utilized for secondary distribution of water with balanced nutrient levels to account for losses and absorption in the hydroponic plant growth modules above. Once the water and nutrients complete the vertical traverse, the remaining water and nutrients that leave the lowest hydroponic plant growth module is collected in a pan 330, recycled to the master water reservoir where the nutrient levels are automatically analyzed and again replenished to optimal levels before repeating the cycle.

Provided herein is a multi-stage, automated plant growing system configured for high density growth and crop yield, the system comprising: an enclosed, environmentally-controlled growing chamber; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition is automatically manipulated and adjusted for any given crop, responsive to at least one identified crop characteristic, in order to optimize the crop characteristic from one crop cycle to the next.

Provided herein is a multi-stage, automated plant growing system configured for high density growth and crop yield, the system comprising: an enclosed, environmentally-controlled growing chamber; a plurality of vertical growth columns, disposed within the growing chamber, configured to support at least one hydroponic plant growth module; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; an airflow source configured to direct airflow to disrupt the boundary layer of at least one plant under-canopy of a plant growing in one of the hydroponic plant growth modules; a light emitting source configured to encourage lateral plant growth from the at least one lateral growth opening in at least one hydroponic plant growth module; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition is automatically manipulated and adjusted for any given crop, responsive to at least one identified crop characteristic, in order to optimize the crop characteristic from one crop cycle to the next.

Provided herein is a multi-stage, automated plant growing system configured for high density growth and crop yield, the system comprising: an enclosed, environmentally-controlled growing chamber; a plurality of vertical growth columns configured to support at least one plant hydroponic plant growth module; a conveyance system for moving the plurality of vertical growth columns about the perimeter of the supporting structure in a circuit throughout a crop growth cycle; a plurality of said hydroponic plant growth modules, each configured for mounting to the vertical growth columns, each hydroponic plant growth module comprising at least one lateral growth opening; a gravity-feed nutrient supply system configured to provide water and nutrients to the hydroponic plant growth modules with a delivery mechanism affixed to the vertical columns; a light emitting source configured to encourage lateral plant growth from the at least one lateral growth opening in at least one hydroponic plant growth module; an airflow source configured to direct airflow to disturb the boundary layer of at least one plant under-canopy of a plant growing in one of the hydroponic plant growth modules; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition and movement of the conveyance system is automatically manipulated and adjusted for any given crop, responsive to at least one identified crop characteristic, in order to optimize the crop characteristic and provide optimal control of the crop density and yield throughout each crop growth cycle from one crop cycle to the next.

Provided herein is a multi-stage, automated plant growing system configured for high density growth and crop yield, the system comprising: an enclosed, environmentally-controlled growing chamber; a plurality of vertical growth columns, disposed within the growing chamber, each vertical growth column configured from a plurality of hydroponic plant growth modules; wherein the plurality of said hydroponic plant growth modules are each configured for mounting to another hydroponic plant growth module above and below itself in order to form said vertical growth column, each hydroponic plant growth module comprising at least one lateral growth opening; a structure for supporting the plurality of vertical growth columns; a conveyance system for moving the plurality of vertical growth columns about the perimeter of the supporting structure in a circuit throughout a crop growth cycle; a gravity-feed nutrient supply system configured to provide water and nutrients to the hydroponic plant growth modules with a delivery mechanism affixed to the vertical columns; an airflow source configured to direct airflow to disturb the boundary layer of at least one plant under-canopy of a plant growing in one of the hydroponic plant growth modules; a light emitting source configured to encourage lateral plant growth from the at least one lateral growth opening in at least one hydroponic plant growth module; and a computer-implemented automated control system capable of machine learning comprising: a digital processing device comprising an operating system configured to perform executable instructions and a memory; a computer program including instructions executable by the digital processing device to create an automated control system for regulating at least one growing condition comprising at least one of: a software module configured to regulate a temperature; a software module configured to regulate a humidity; a software module configured to regulate a gas content; a software module configured to regulate the airflow; a software module configured to regulate a flow of the water and nutrients; a software module configured to a quality or a quantity of light emission from a light source; and a software module configured to regulate a movement of growing plants around a growing circuit; wherein the automated control system is capable of machine learning such that regulation of the at least one growing condition and movement of the conveyance system is automatically manipulated and adjusted for any given crop, responsive to at least one identified crop characteristic, in order to optimize the crop characteristic and provide optimal control of the crop density and yield throughout each crop growth cycle from one crop cycle to the next.

In some embodiments of the system, the environment control system is comprises artificial intelligence software.

In any one of the preceding multi-stage automated plant growing system embodiments, the system further comprises a plenum to receive and direct air from the airflow source; wherein the airflow source is a forced airflow, and wherein the plenum further comprises a plurality of ducts configured to divide and distribute said forced airflow with fans and or blowers to disturb the boundary layer of at least one plant under-canopy and to at least two or more of the vertical growth columns. As with any current automated HVAC system, the Automated Control System of the multi-stage automated plant growing system is capable of controlling the airflow through the plenum, controlling the opening and closing of vents in the ducts, as appropriate In any one of the preceding multi-stage plant growing system embodiments, the airflow may be generated by any means of turbulence such that air if forced to move toward and/or through the boundary layer of said plant or plants in the vertical growth system. The turbulence may be generated from above, below or laterally to the plant or plants in the column such that the air is forced to move through the boundary layer and reduce or remove excess heat and/or humidity from the boundary layer and roots.

In some embodiments of the system, the system further comprises a plurality of sensors configured to monitor growing conditions in the environmentally-controlled growing chamber, the growing conditions comprising; temperature; humidity; gas content; airflow; flow of the water; flow of the nutrients; quality of light emission from the light source; and a quantity of light emission from the light source; wherein the plurality of sensors provide feedback to the environmental control system, and wherein the environmental control system is capable of adjusting the growing conditions within the environmentally-controlled growing chamber on an as-needed basis.

In some embodiments of the system, the master control system (capable of machine learning and) further comprises logic capable of regulating and balancing the environmental control system and controlling the conveyance system for any given crop, responsive to at least one identified crop characteristic, in order to optimize the crop characteristic from one crop cycle to the next.

Referring now to FIG. 20, the illustrative schematic of the machine learning capability and system controls associated with the automated master control system illustrates examples of input data collected through the sensors or sensor arrays, (i.e.: that the master control system utilizes as part of the machine learning process to monitor and control the growth cycles in order to affect the crop outputs such as taste, nutritional output, weight color, texture, size, etc. The various inputs comprise items such as: nutrient levels, water pH, electrical conductivity (EC), various gas level concentrations such as $O_2$, $CO_2$, $O_2$ dissolved in water, water temperature, air temperature, environmental ambient air speed, light spectrum, air pressure and humidity. This input data is directed through a supervisory control and data acquisition (SCADA) interface, a system for remote monitoring and control that operates with coded signals over communication channels (using typically one communication channel per remote station).

The control system may be combined with a data acquisition system, (i.e.: sensors/sensor arrays), by adding the use of coded signals over communication channels (i.e.: hard wired or Bluetooth) to acquire information about the status of the remote equipment for display or for recording functions. It is a type of industrial control system (ICS). Industrial control systems are computer-based systems that monitor and control industrial processes that exist in the physical world. SCADA systems historically distinguish themselves from other ICS systems by being large-scale processes utilizing cloud server systems that can include multiple sites, and large distances. These processes include industrial, infrastructure, and facility-based processes.

Data collected via the SCADA interface includes instantaneous, real-time inquires that allow the master control system to make real-time adjustments throughout the growth cycle and store the learned information for future crop growth cycles.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A plant growing system configured for high density crop growth and yield, the system comprising:
   an environmentally-controlled growing chamber;
   a vertical growth column located within the growing chamber, wherein the vertical growth column contains a plurality of vertically aligned hydroponic plant growth modules, each hydroponic plant growth module of the plurality of vertically aligned hydroponic plant growth modules containing a growth media, wherein each hydroponic plant growth module is individually detachable from the vertical growth column, each hydroponic plant growth module further comprising:
      a lateral growth opening configured to allow at least one growing crop plant to grow through the lateral growth opening in a lateral direction of growth; and
      an upper opening and a lower opening, the upper opening and the lower opening configured to allow an aqueous crop nutrient solution to flow therethrough;
   a light emitting source positioned laterally from the vertical growth column and laterally from the plurality of vertically aligned hydroponic plant growth modules and laterally from the lateral growth opening of each of the hydroponic plant growth modules contained within the vertical growth column, the light emitting source configured to emit light toward the lateral growth opening of each of the hydroponic plant growth modules contained within the vertical growth column;
   a nutrient supply system configured to direct the aqueous crop nutrient solution to the plurality of vertically aligned hydroponic plant growth modules, wherein the aqueous crop nutrient solution flows through the upper opening and the lower opening of each of the plurality of vertically aligned hydroponic plant growth modules contained within the vertical growth column; and
   an airflow source configured to direct airflow away from the lateral growth opening in the lateral growth direction of growth and through an under-canopy of the growing crop plant so as to disturb a boundary layer of the under-canopy of the growing crop plant.

2. The plant growing system of claim 1, further comprising a conveyance system for moving the vertical growth column in a circuit within the environmentally-controlled growing chamber, the circuit comprising a staging area configured for individually loading at least one plant into each of the plurality of vertically aligned hydroponic plant growth modules and a harvesting area for individually harvesting plants from each of the plurality of vertically aligned hydroponic plant growth modules.

3. The plant growing system of claim 1, further comprising a control system, said control system including a sensor configured for measuring an environmental growing condition in the environmentally controlled growing chamber over time to generate environmental condition data.

4. The plant growing system of claim 1, further comprising a plenum to receive and direct air from the airflow source, wherein the plenum comprises a plurality of ducts.

5. The plant growing system of claim 1, wherein the plurality of vertically aligned hydroponic plant growth modules are stackable within the vertical growth column.

6. The plant growing system of claim 1, wherein each hydroponic plant growth module of the plurality of vertically aligned hydroponic plant growth modules is configured to receive through the upper opening the aqueous crop nutrient solution and direct through the lower opening the aqueous crop nutrient solution.

7. The plant growing system of claim 1, wherein the light emitting source comprises light emitting diodes (LEDs).

8. The plant growing system of claim 1, further comprising a control system, wherein the control system regulates flow rate of the aqueous crop nutrient solution.

9. The plant growing system of claim 1, wherein the vertical growth column is configured to be free-standing.

10. The plant growing system of claim 1, further comprising a loading/unloading system to control position and movement of each hydroponic plant growth module of the plurality of vertically aligned hydroponic plant growth modules along the vertical growth column.

11. The plant growing system of claim 1, further comprising a control system, wherein the control system regulates a nutrient supply control sub-system.

* * * * *